US008020889B2

(12) United States Patent
Bauer et al.

(10) Patent No.: US 8,020,889 B2
(45) Date of Patent: Sep. 20, 2011

(54) PASSIVE AIRBAG VENTING

(75) Inventors: Barney J. Bauer, Rochester, MI (US); Moe M. Boumarafi, Rochester Hills, MI (US); Jerome Bosch, Romeo, MI (US); Jonathan L. Clarke, Berkley, MI (US); Nate Dennis, Grand Blanc, WI (US); James P. Karlow, Milford, MI (US); Amy L. Klinkenberger, Highland, MI (US); Vivekananadhan Maripudi, Rochester Hills, MI (US); Michael J. Scavnicky, Northville, MI (US); Jamie F. Perez Aguilar, Lake Orion, MI (US); Stephanie M. McFadden, Oxford, MI (US); Paul A. Baker, Royal Oak, MI (US); Paul G. Maertens, Highland, MI (US); John Paul Ruterbusch, Auburn Hills, MI (US); Ray John Roberts, Pontiac, MI (US); Joseph M. Ehrke, Mt. Clemens, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 921 days.

(21) Appl. No.: 11/523,810

(22) Filed: Sep. 20, 2006

(65) Prior Publication Data

US 2007/0108750 A1     May 17, 2007

Related U.S. Application Data

(60) Provisional application No. 60/718,746, filed on Sep. 21, 2005, provisional application No. 60/725,636, filed on Oct. 13, 2005, provisional application No. 60/750,799, filed on Dec. 16, 2005, provisional application No. 60/750,804, filed on Dec. 16, 2005, provisional application No. 60/745,024, filed on Apr. 18, 2006.

(51) Int. Cl.
B60R 21/239 (2006.01)
B60R 21/23 (2006.01)
(52) U.S. Cl. .................................... 280/739; 280/743.2
(58) Field of Classification Search .................. 280/739, 280/743.2
See application file for complete search history.

(56) References Cited

U.S. PATENT DOCUMENTS

| 5,213,361 A | 5/1993 | Satoh et al. |
| 5,280,953 A | 1/1994 | Wolanin et al. |
| 5,405,166 A | 4/1995 | Rogerson |

(Continued)

FOREIGN PATENT DOCUMENTS

JP    09-142239    3/1997

(Continued)

Primary Examiner — Paul N. Dickson
Assistant Examiner — George D. Spisich
(74) Attorney, Agent, or Firm — Foley & Lardner LLP

(57) ABSTRACT

An occupant protection apparatus comprises an inflatable airbag with a panel, the panel including a first vent opening that permits inflation fluid to escape out of the airbag; and a valve sheet including a second vent opening movable relative to the first vent opening, the valve sheet having opposite ends that are each fixed to a surface of the airbag. One end of the valve sheet moves with the panel during inflation of the airbag to move the second vent opening relative to the first vent opening. The apparatus also includes a valve guide to guide movement of the valve sheet relative to the panel, the valve sheet is capable of sliding between the valve guide and the panel. Both ends of the valve sheet remain fixed to the panel during and after inflation of the airbag.

19 Claims, 35 Drawing Sheets

U.S. PATENT DOCUMENTS

| | | | |
|---|---|---|---|
| 5,468,013 | A | 11/1995 | Gille |
| 5,489,119 | A | 2/1996 | Prescaro et al. |
| 5,501,488 | A | 3/1996 | Saderholm et al. |
| 5,513,879 | A | 5/1996 | Patel et al. |
| 5,560,649 | A | 10/1996 | Saderholm et al. |
| 5,568,938 | A | 10/1996 | Lindstrom |
| 5,603,526 | A | 2/1997 | Buchanan |
| 5,704,639 | A | 1/1998 | Cundill et al. |
| 5,853,191 | A | 12/1998 | Lachat |
| 5,931,497 | A | 8/1999 | Fischer |
| 6,139,052 | A | 10/2000 | Preamprasitchai |
| 6,247,726 | B1 | 6/2001 | Ryan |
| 6,308,983 | B1 | 10/2001 | Sinnhuber |
| 6,334,627 | B1 | 1/2002 | Heym et al. |
| 6,648,371 | B2 * | 11/2003 | Vendely et al. ............... 280/739 |
| 6,659,499 | B2 | 12/2003 | Jenkins |
| 6,669,231 | B2 | 12/2003 | Ryan |
| 6,676,158 | B2 | 1/2004 | Ishikawa |
| 6,722,691 | B1 | 4/2004 | Håland et al. |
| 6,746,045 | B2 | 6/2004 | Short et al. |
| 6,773,030 | B2 * | 8/2004 | Fischer ........................ 280/739 |
| 6,796,583 | B2 | 9/2004 | Keshavaraj |
| 6,799,777 | B2 | 10/2004 | Hawthorn et al. |
| 6,830,265 | B2 | 12/2004 | Ford |
| 6,832,778 | B2 | 12/2004 | Pinsenschaum et al. |
| 6,834,886 | B2 | 12/2004 | Hasebe et al. |
| 6,869,101 | B2 | 3/2005 | White et al. |
| 6,918,613 | B2 | 7/2005 | Short et al. |
| 6,932,385 | B2 | 8/2005 | Hawthorn et al. |
| 6,945,559 | B2 | 9/2005 | Kassman et al. |
| 6,959,945 | B2 | 11/2005 | Fischer et al. |
| 6,991,258 | B2 | 1/2006 | Hawthorn et al. |
| 7,000,943 | B2 | 2/2006 | Hasebe et al. |
| 7,134,691 | B2 | 11/2006 | Dunkle et al. |
| 7,264,268 | B2 | 9/2007 | Ehrke |
| 7,314,228 | B2 | 1/2008 | Ishiguro et al. |
| 7,334,812 | B2 | 2/2008 | Abe |
| 7,445,237 | B2 | 11/2008 | Boyle, III et al. |
| 7,497,469 | B2 | 3/2009 | Fischer et al. |
| 7,793,978 | B2 | 9/2010 | Vigeant et al. |
| 2001/0033072 | A1 | 10/2001 | Kumagai et al. |
| 2001/0035639 | A1 | 11/2001 | Amamori |
| 2002/0175511 | A1 | 11/2002 | Dunkle et al. |
| 2003/0218325 | A1 | 11/2003 | Hasebe et al. |
| 2004/0012180 | A1 | 1/2004 | Hawthorn et al. |
| 2004/0017069 | A1 * | 1/2004 | Fischer ........................ 280/739 |
| 2004/0051285 | A1 | 3/2004 | Fischer |
| 2004/0051286 | A1 | 3/2004 | Fischer et al. |
| 2004/0056459 | A1 | 3/2004 | Kassman et al. |
| 2004/0145160 | A1 | 7/2004 | Hasebe et al. |
| 2004/0145161 | A1 | 7/2004 | Hasebe et al. |
| 2004/0150200 | A1 | 8/2004 | Yamada et al. |
| 2004/0155439 | A1 | 8/2004 | Hasebe et al. |
| 2004/0155440 | A1 | 8/2004 | Hasebe et al. |
| 2004/0155443 | A1 | 8/2004 | Ford |
| 2004/0160041 | A1 | 8/2004 | Hasebe et al. |
| 2004/0188990 | A1 | 9/2004 | Short et al. |
| 2005/0029781 | A1 | 2/2005 | Enders et al. |
| 2005/0040634 | A1 | 2/2005 | Braun et al. |
| 2005/0040635 | A1 | 2/2005 | Hawthorn et al. |
| 2005/0057030 | A1 | 3/2005 | Fischer et al. |
| 2005/0098990 | A1 | 5/2005 | Pinsenschaum et al. |
| 2005/0104339 | A1 | 5/2005 | Hasebe et al. |
| 2005/0110249 | A1 | 5/2005 | Hasebe et al. |
| 2005/0127648 | A1 | 6/2005 | Fischer et al. |
| 2005/0146122 | A1 | 7/2005 | Gould et al. |
| 2005/0161918 | A1 | 7/2005 | Bito |
| 2005/0184489 | A1 | 8/2005 | Kobayashi |
| 2005/0194769 | A1 | 9/2005 | Abe |
| 2005/0236822 | A1 | 10/2005 | Rose et al. |
| 2005/0248137 | A1 | 11/2005 | Delventhal et al. |
| 2006/0125215 | A1 | 6/2006 | Clarke et al. |
| 2006/0125219 | A1 | 6/2006 | Kokeguchi et al. |
| 2006/0181067 | A1 | 8/2006 | Maripudi |
| 2006/0237953 | A1 | 10/2006 | Abe |
| 2007/0132222 | A1 | 6/2007 | Thomas et al. |
| 2007/0145729 | A1 * | 6/2007 | Ishiguro et al. ............... 280/739 |
| 2007/0152435 | A1 | 7/2007 | Jamison et al. |
| 2007/0182144 | A1 | 8/2007 | Aranzulla et al. |
| 2007/0210568 | A1 | 9/2007 | Thomas et al. |
| 2008/0073892 | A1 * | 3/2008 | Rose et al. ................... 280/739 |
| 2008/0179866 | A1 * | 7/2008 | Maertens ...................... 280/739 |

FOREIGN PATENT DOCUMENTS

| | | |
|---|---|---|
| JP | 2005-014861 | 1/2005 |
| JP | 2005-014862 | 1/2005 |
| JP | 2005-014863 | 1/2005 |
| JP | 2005-014864 | 1/2005 |

* cited by examiner

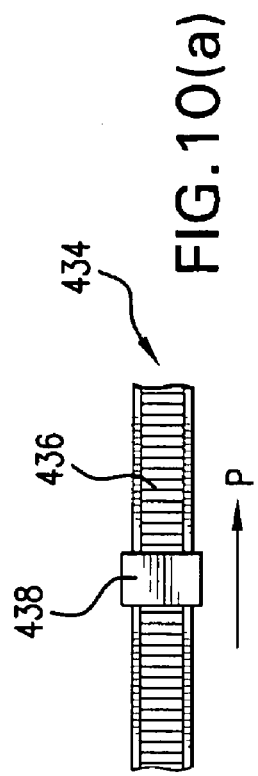
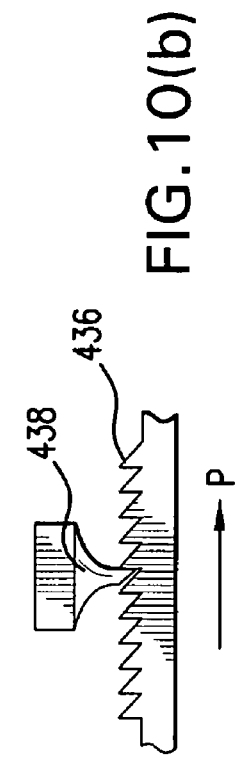
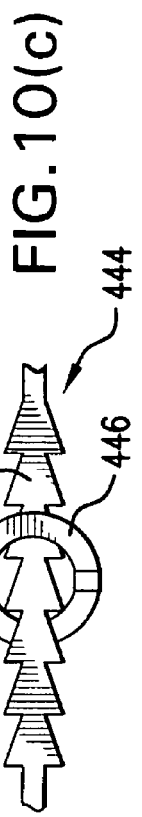
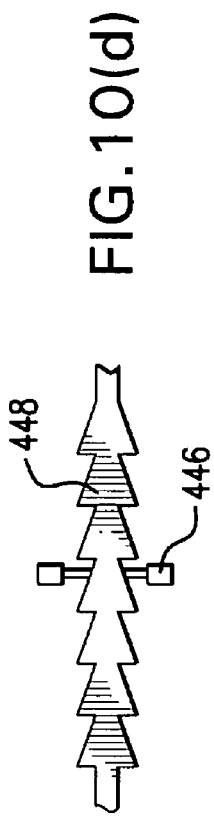
FIG.10(a)
FIG.10(b)
FIG.10(c)
FIG.10(d)
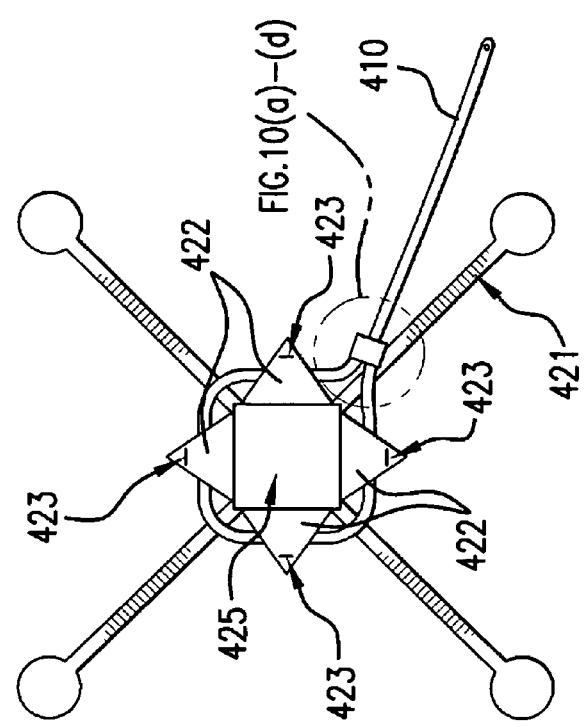
FIG.9

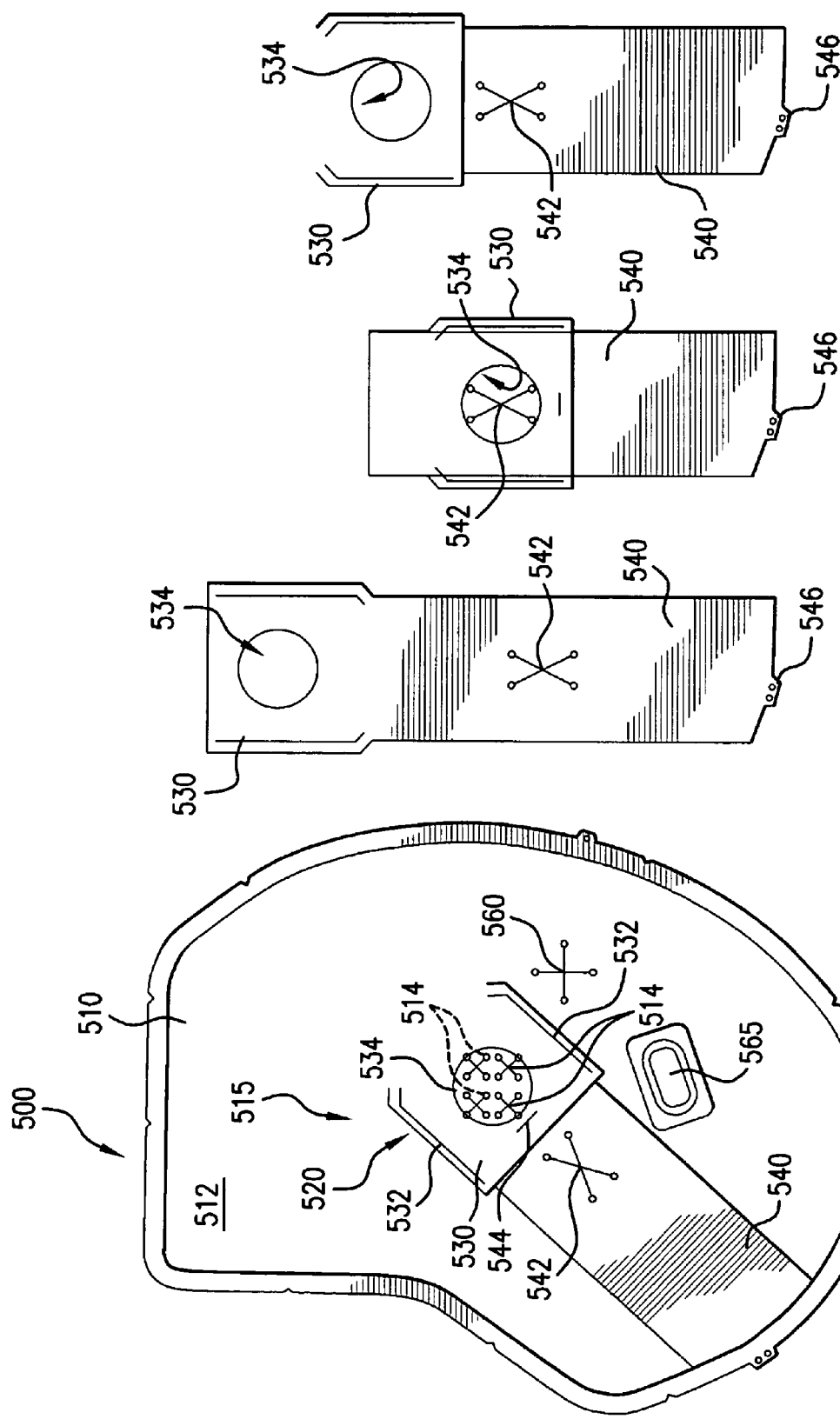

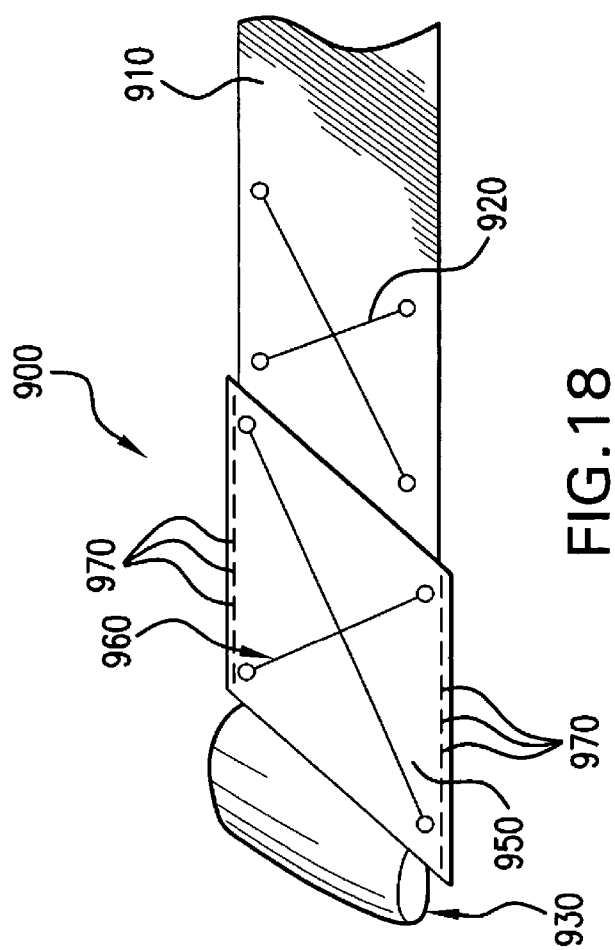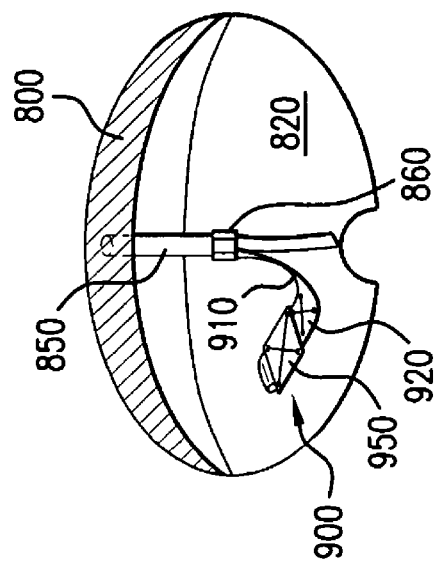

PASSIVE AIRBAG VENTING

CROSS-REFERENCE TO RELATED PATENT APPLICATIONS

This application claims the benefit of and priority to U.S. Provisional Patent Application Nos.: 60/718,746 filed Sep. 21, 2005; 60/725,636 filed Oct. 13, 2005; 60/750,804 filed Dec. 16, 2005; 60/750,799 filed Dec. 16, 2005; and 60/745,024 filed Apr. 18, 2006, all of which are incorporated herein by reference in their entirety.

BACKGROUND

The present invention relates generally to the field of venting assemblies for airbags. More specifically, the present invention relates to passive venting assemblies.

Airbags may include venting assemblies to release inflation fluid out of the airbag. Generally, venting assemblies are located in the airbag housing adjacent the inflator.

Some airbag systems utilize active sensor and/or control systems to control the deployment of the airbag during an accident involving a rear facing infant seat (RFIS) or out-of-position (OOP) occupant that will minimize potential injuries to occupants from the airbag itself. Such electronic sensor and control systems can be expensive and, more significantly, the complexity of the sensor and control systems may make high reliability difficult to achieve in some circumstances. These conventional "active" assemblies may also require a significant amount of space in an airbag system.

Passive venting systems are advantageous because they do not require costly equipment to manufacture or install. Passive venting systems are advantageous because the mechanism is simpler than an electronic control system and may be more reliable than an electronic control system.

SUMMARY

An embodiment of the invention provides an occupant protection apparatus. The apparatus comprises: an inflatable airbag including a panel, wherein the panel includes a first vent opening through which inflation fluid may escape out of the airbag; a moveable valve sheet overlying the first vent opening and including a second vent opening movable relative to the first vent opening, the valve sheet being fixed to a surface of the panel at opposite ends; and a valve guide to guide movement of the valve sheet relative to the panel. The valve sheet is configured to slide between the valve guide and the panel. One end of the valve sheet moves with the panel during inflation of the airbag to move the second vent opening relative to the first vent opening. The first and a second end of the valve sheet are fixed to the panel during and after inflation of the airbag.

Another embodiment of the invention provides an occupant protection apparatus. The apparatus comprises: an inflatable airbag with a panel, the panel including a first vent opening to enable escape of inflation fluid out of the airbag; a valve sheet including a second vent opening movable relative to the first vent opening; and a tear tab extending from a portion of the valve sheet to temporarily retain the valve sheet to the panel, the tear tab breaking when the airbag is inflated to a predetermined inflation level to move the second vent opening relative to the first vent opening.

Another embodiment of the invention provides an airbag apparatus. The apparatus comprises: a fabric panel including a vent opening configured to allow inflation gas to escape from the airbag therethrough; and a valve assembly configured to block the vent opening. The valve assembly is configured so that when the airbag begins to inflate the vent opening is not blocked, and when the airbag deploys to a predetermined position, the valve assembly closes the vent opening.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2(a) is a perspective view and FIG. 2(b) is a side view.

FIG. 3(a) shows a guide stitch pattern wherein a valve sheet includes two connection bands. FIG. 3(b) shows a guide stitch pattern wherein the valve sheet includes three connection bands.

FIG. 9 is a close-up view of the vent assembly of FIG. 8.

FIGS. 10(a), 10(b), 10(c) and 10(d) are views of different closures to be employed with the vent assembly of FIG. 8. FIGS. 10(a) and 10(b) illustrate a pull tie type closure device. FIGS. 10(c) and 10(d) illustrate a cable clamp type closure device.

FIG. 11 is a top view of an airbag panel including another embodiment of a vent assembly.

FIGS. 12(a), 12(b) and 12(c) are views of a vent patch according to another embodiment of a vent assembly. FIG. 12(a) illustrates the vent patch in an extended state. FIG. 12(b) illustrates the vent patch prior to deployment of the airbag. FIG. 12(c) illustrates the vent patch after deployment.

FIG. 18 is a view of the venting apparatus of FIG. 16 in which a strap is extended to close an airbag vent.

FIG. 19 is a view of the venting apparatus of FIG. 18 in conjunction with an airbag, in which a sectional view of the airbag is shown.

DETAILED DESCRIPTION

Figure 1A:
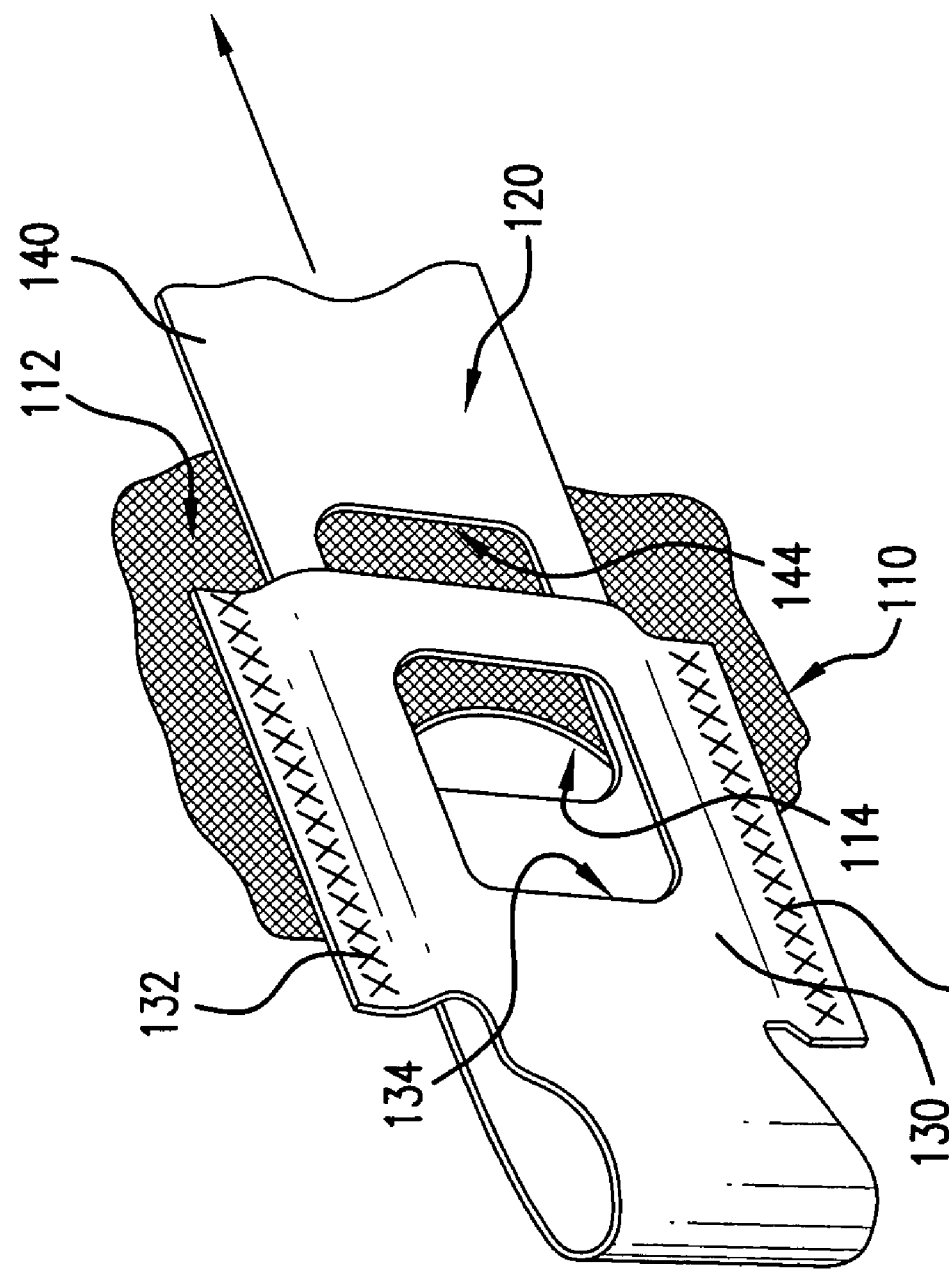
FIG. 1(a) is a detail perspective of a vent assembly for an airbag.
Figure 1B:
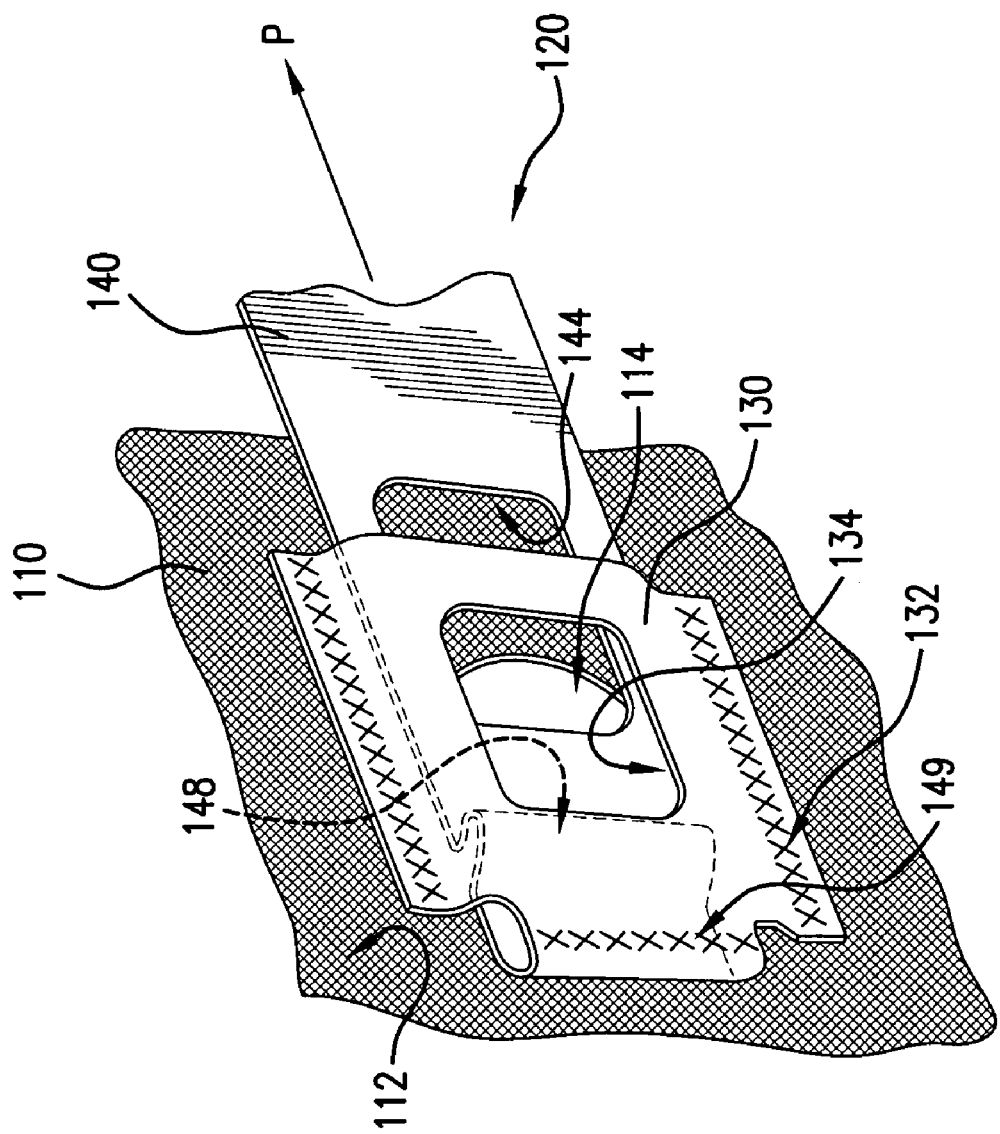
FIG. 1(b) is a detail perspective view of the vent assembly of FIG. 1(a) in which a valve sheet is shown with excess material stowed.

The airbag 100 includes a vent valve 115. The vent valve 115 includes a valve guide 120, which overlies an opening 114 in a panel 112 of the airbag 100. The valve guide 120 and opening 114 form the vent valve 115, which opens and closes based on the relative position of the opening 114 and the guide 120. The actuation of the valve 115 is controlled by the slope of the airbag 100 during deployment.

As the airbag 100 inflates, the airbag 100 can impact an object, such as a rear facing child seat 160 or an out-of-position (OOP) occupant. If the airbag 100 does impact a rear facing child seat 160 or other object that restricts the trajectory of the airbag 100, the valve 115 will remain open so that the impact of the airbag 100 is relatively soft. If the airbag 100 does not impact a trajectory-limiting object, the cushion vent 114 will close as the airbag 100 expands so that the airbag 100 is capable of protecting a normally seated occupant. Since the valve 115 closes during unimpeded deployment of the airbag 100, dynamic occupant restraint can remain similar to current designs without passive venting.

Generally, conventional self-activating vents are positioned in the airbag module housing. In the embodiments shown, the valve 115 is positioned to work in conjunction with an opening 114 in the fabric 110 of the airbag 100 and not in the airbag module housing 105. The opening 114 can be positioned in any suitable location on the airbag 100 and/or airbag fabric 110.

The vent guide 120 is a one piece fabric guide that is sewn or attached to an inner surface 112 of the cushion fabric 110. The vent guide 120 includes a valve guide pocket 130 and a valve sheet 140. The vent guide 120 is positioned adjacent to and alignable with the opening 114 in the airbag 100. Initially, prior to the deployment of the airbag 100 and during the initial deployment, the opening 114 is open. If the airbag 100 impacts an object, which restricts the trajectory of the airbag 100, the vent guide 120 blocks the cushion opening 114.

The valve guide pocket 130 is attached by stitch seam lines 132 to the inner surface 112 of the cushion fabric 110. The valve guide pocket 130 creates a pocket or guide for the remaining portion of the vent guide 120 to be positioned through in order to maintain the valve sheet 140 over the cushion opening 114. The valve guide pocket 130 also includes an opening 134, which allows for inflation gases to escape through the cushion opening 114.

The valve sheet 140 extends from one end of the valve guide pocket 130, loops between the valve guide pocket 130 and the inner surface 112 of the cushion fabric 110 and extends along, forming a valve sheet extension 150 (shown in FIG. 2) that is attached to the inner surface 112 of the fabric panel 110 away from the cushion opening 114. The valve sheet 140 includes a valve port 144 (second vent opening) which aligns with, at least initially, the cushion opening 114, and allows for inflation gases to escape through the cushion opening 114. The valve sheet 140 includes guide stitches in a pattern, such as shown in FIGS. 3(a) and 3(b) (described below). The guide stitches help prevent the valve sheet 140 from deforming and/or minimizes wrinkles 146 formed across the surface of the valve sheet 140 when under tension from the deployment of the airbag 100.

The valve sheet 140 initially contains excess material 148. This excess material 148 can be stowed by being folded or rolled up and held by a stitched seam 149. As the valve sheet extension 150 and valve sheet 140 are pulled in a direction P due to the deployment of the airbag 100, the stitched seam 140 can be pulled out. The removal of the stitched seam 140 allows for the excess material 148 to release and the valve sheet 140 to extend.

Figure 2A:
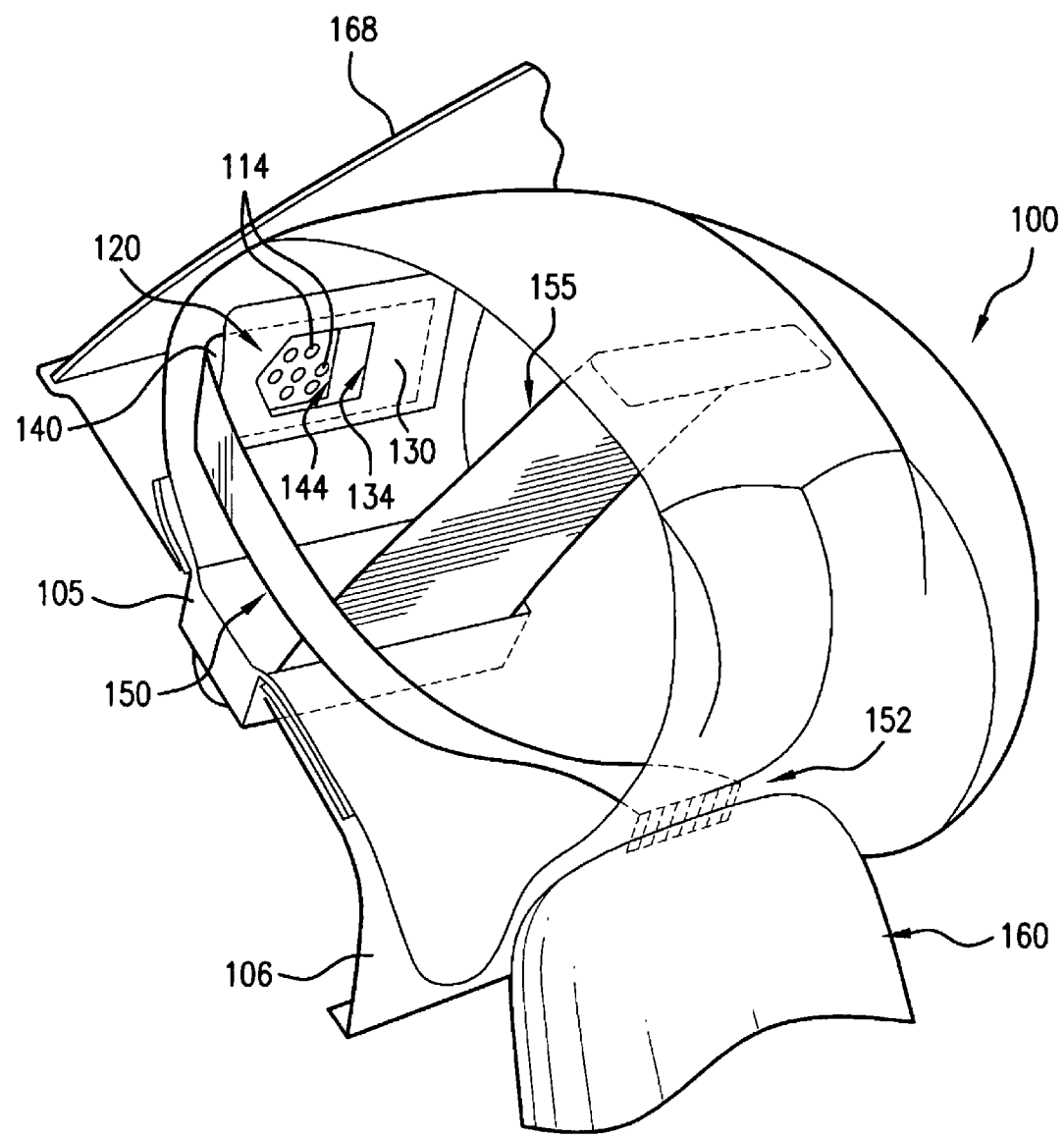
FIGS. 2(a) and 2(b) are cross-sectional views of an airbag including the vent assembly of FIG. 1(a) in which the airbag impacts an object during deployment.
Figure 2B:
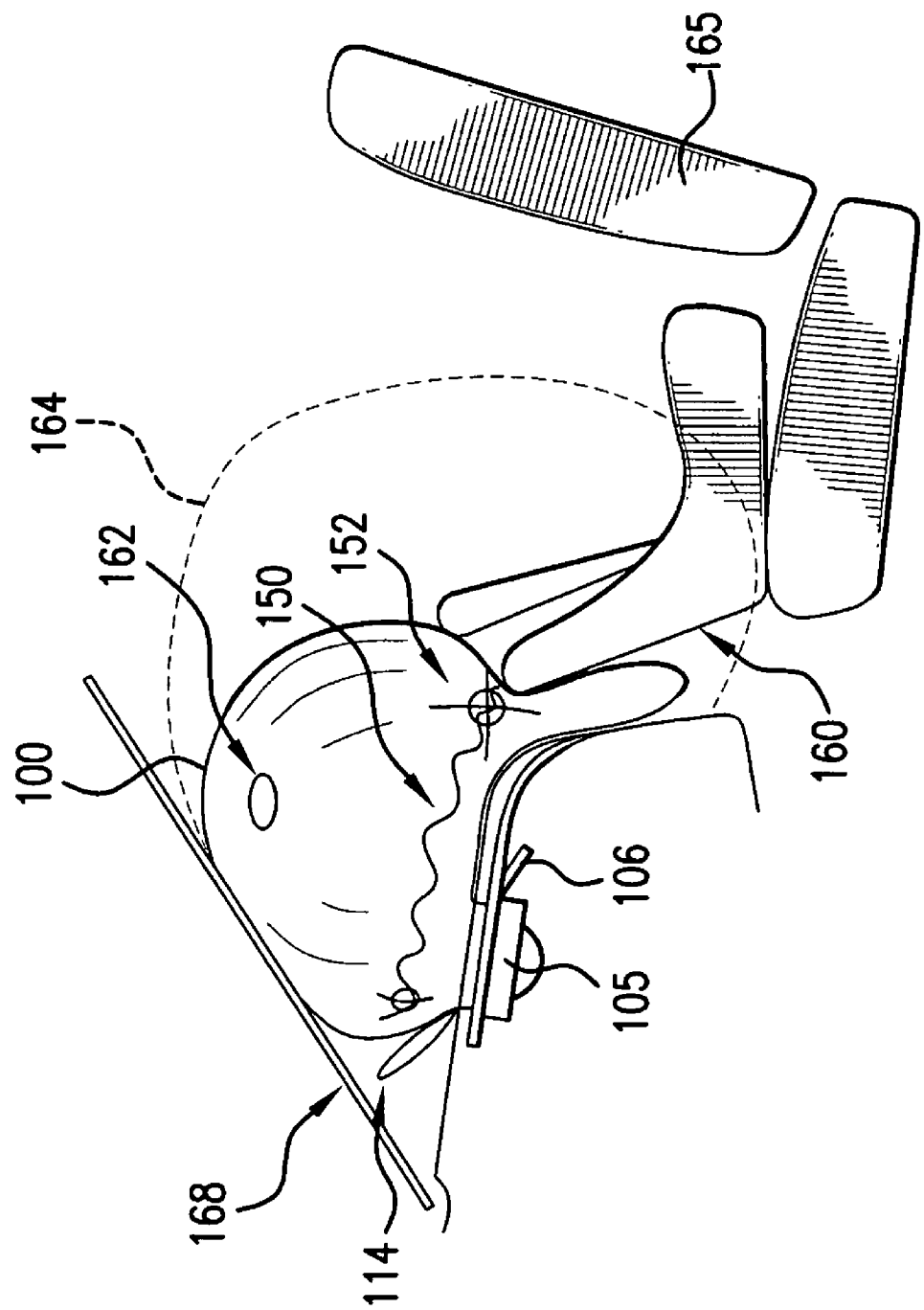
Figure 3A:
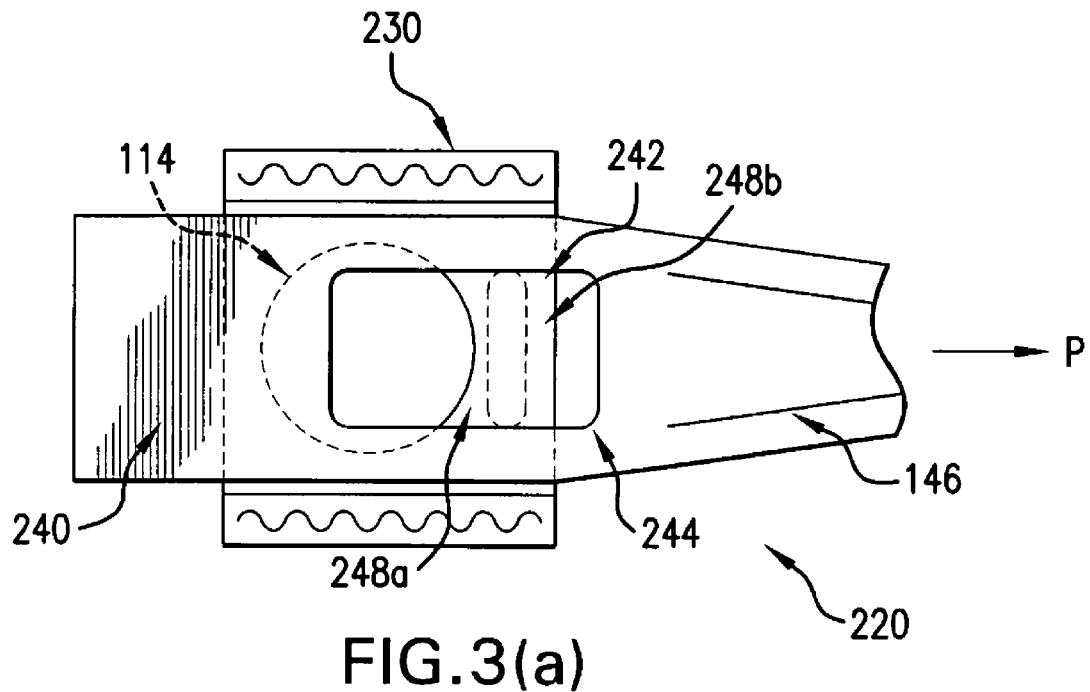
FIGS. 3(a) and 3(b) are views of another embodiment of a vent assembly for an airbag.
Figure 3B:
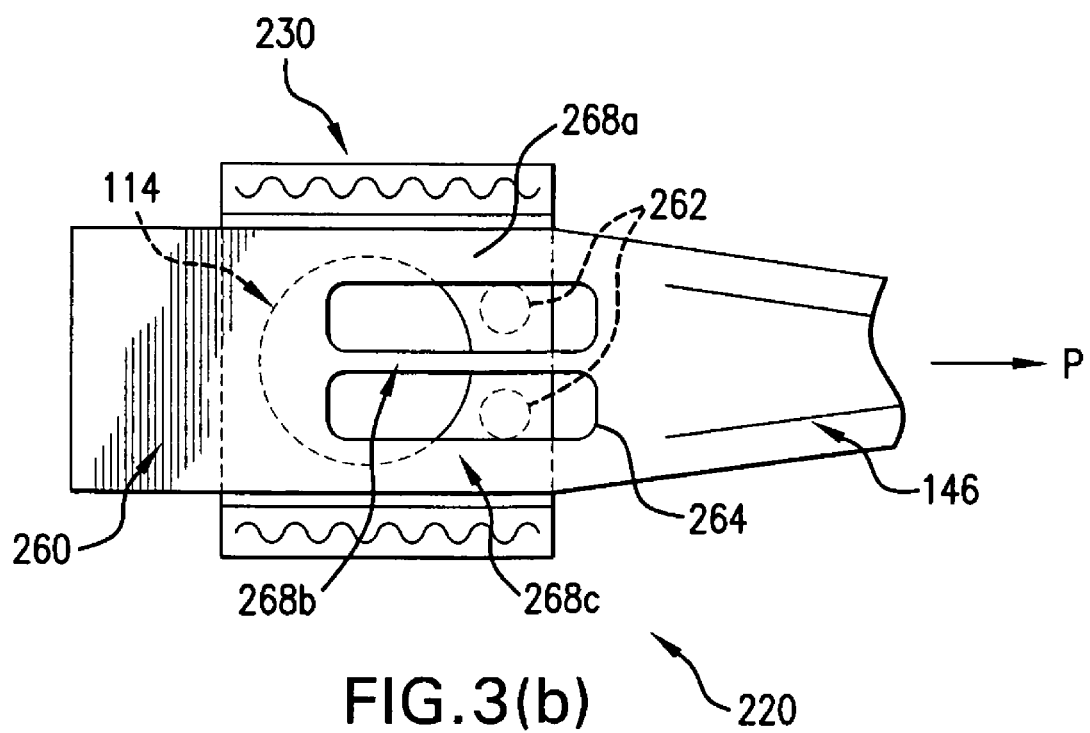

FIGS. 2(a) and 2(b) show the airbag 100 during full deployment. The airbag 100 is shown with a tether 155, such as used with a dual lobe airbag. In the embodiment shown here, the cushion opening 114 is located in the inner surface 112 of the cushion fabric 110 on a side adjacent a windshield 168 of a vehicle. As the airbag 100 deploys, the airbag 100 exits the airbag module 105, breaking open the cover 106, and expanding into an interior space of a vehicle. As shown in FIG. 3, the airbag 100 impacts a rear facing child seat 160, which limits the trajectory of the airbag 100.

The valve sheet extension 150, which can be integrally formed with the valve sheet 140, is attached at an anchor point 152 located near a contact point of a rear facing child seat 160, which generally sits upon a vehicle seat. Thus, when the airbag 100 impacts the child seat 160, the valve sheet extension 150 is no longer pulled or stretched, which allows for inflation gases to escape through the valve formed by openings 134, 144 in the vent guide 120 and the cushion opening 114. The extension 150 can be asymmetrical to the additional tether 155.

FIG. 2(b) shows the location of an additional, conventional vent hole 162. The conventional vent 162 is generally located on a top surface of the airbag 100. The airbag 100 in FIGS. 2(a) and 2(b) impacts against a rear facing child seat 160, which limits the trajectory of the airbag 100. FIG. 2(b) shows, along the dotted line 164, the full trajectory of the airbag 100 when there is no object for the airbag 100 to impact.

FIGS. 3(a) and 3(b) show different embodiments of the vent guide 120 with varying guide stitch patterns 242, 262. FIG. 3(a) illustrates a vent guide 220 adjacent the cushion opening 114. The vent guide 220 is similar to the above embodiment and includes a valve guide pocket 230 and a valve sheet 240. The valve guide pocket 230 includes an opening (not shown) to allow for inflation gases to exit through the cushion opening 114.

The valve sheet 240 includes a guide stitch pattern 242. The guide stitch pattern 242, as mentioned above, helps retain the proper position of the valve sheet 240 when a force is applied to the valve sheet 240 in a direction P. As shown in FIG. 3(a), the guide stitch pattern 242 is a generally oblong, single shape. Of course, any other suitable shape may be used. The guide stitch pattern 242 creates connection bands 248a, 248b.

FIG. 3(b) illustrates a vent guide 220 adjacent the cushion opening 114. The vent guide 220 is similar to the above embodiment and includes a valve guide pocket 230 and a valve sheet 260. The valve guide pocket 230 includes an opening (not shown) to allow for inflation gases to exit through the cushion opening 114.

The valve sheet 260 includes a guide stitch pattern 262. The guide stitch pattern 262, as shown in FIG. 3(b), contains dual sections, which are circular in this embodiment. Of course, any other suitable shape, or combination of shapes may be used. The guide stitch pattern 262 creates three connection bands 268a, 268b, and 268c. The central tension band 268b further controls the valve surface and the valve sheet 260.

Figure 4:
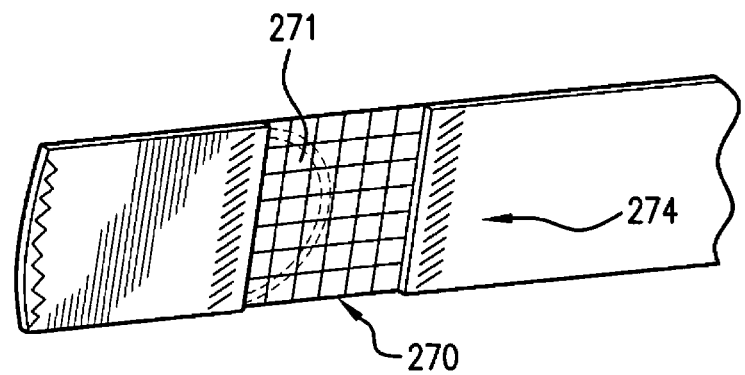
FIG. 4 is a view of an airbag vent assembly according to another embodiment of the invention.

FIG. 4 is a detail view of an airbag fabric 270 and a portion of a valve sheet 274, which extends into a tether. The airbag fabric 270, according to this embodiment, includes a mesh fabric section 271 instead of a vent hole to allow inflation gases to escape. The open mesh fabric section 271 can help prevent the valve sheet 274 from extending through the vent hole under high internal pressure.

Figure 5:
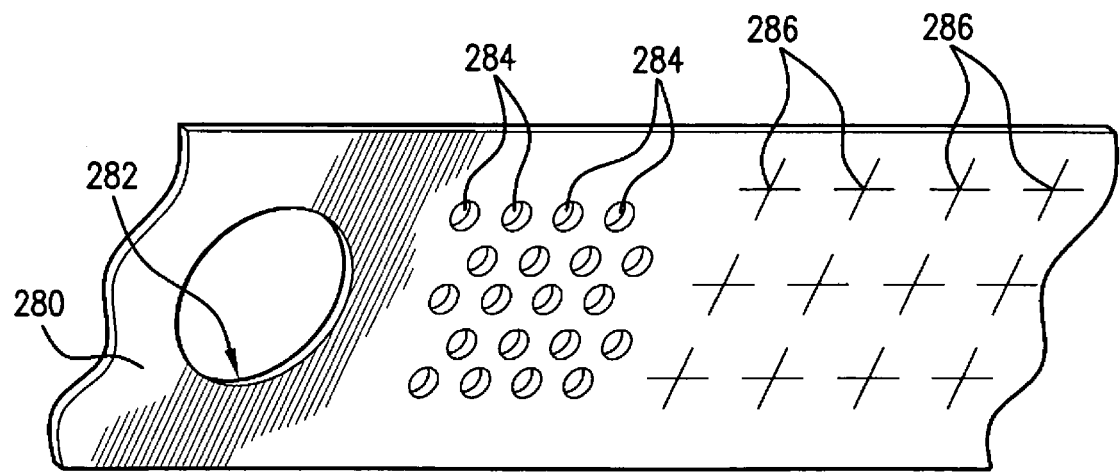
FIG. 5 is an exemplary view of a valve sheet for an airbag vent assembly showing several different embodiments of the invention.

According to additional embodiments of the invention, the airbag fabric 280 can include a variety of, including a combination of, cushion vents and openings. For example, as shown in FIG. 5, the airbag fabric 280 can include a single vent opening 280, a plurality of openings 284, or cross-vents. The cross-vents can help prevent a valve sheet from extending through the cushion openings.

Figure 6:
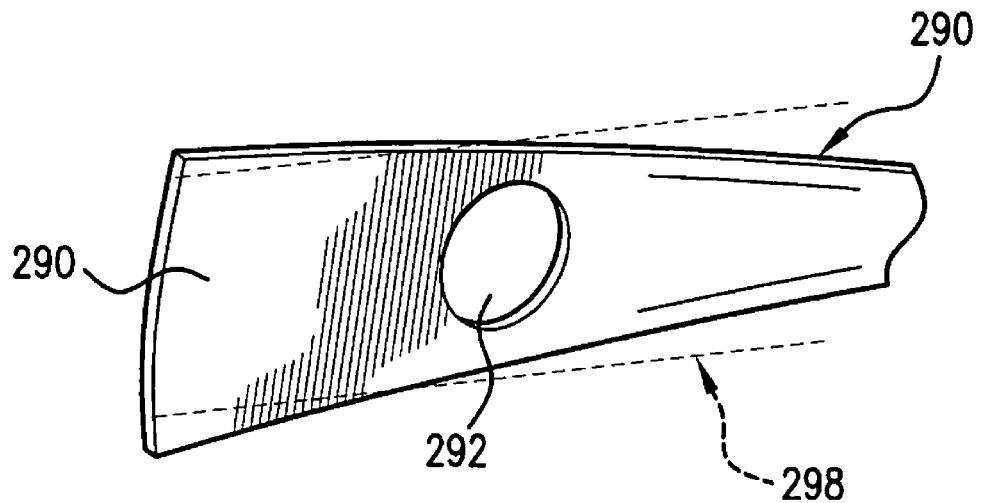
FIG. 6 is a view of a vent assembly for an airbag according to another embodiment of the invention.

In an embodiment shown in FIG. 6, the valve sheet 290 has a tapered shape. The valve sheet 290 can taper to a narrower section, such as, for example, after the port opening 292 in the direction of the valve sheet extension. This tapered shape can be seen in comparison to a conventional tether panel shape, such as shown by reference numeral 298. The tapered valve sheet 290 shape can prevent gathering or twisting of the valve sheet 290 under tensile loading conditions.

Figure 7:
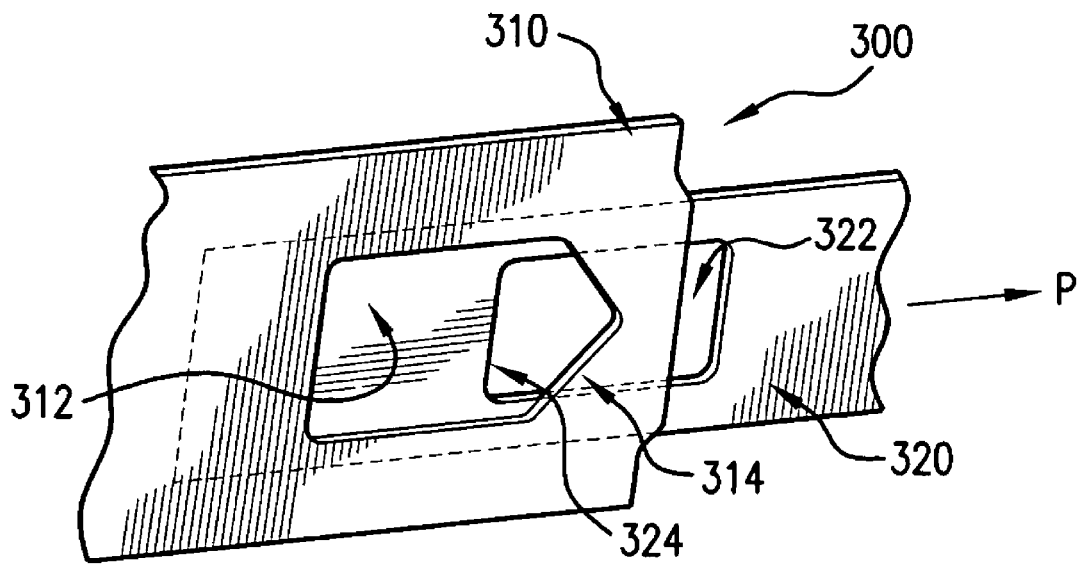
FIG. 7 is a view of a vent assembly for an airbag according to another embodiment of the invention.

In yet another embodiment of the invention, as can be seen in FIG. 7, a vent guide 300 includes a valve guide pocket 310 and a valve sheet 320. The valve guide pocket 310 includes an opening or port 312 for inflation gases. A forward edge of the port 312 is formed in a general "V" shaped cut 314. This V shape 314 can help prevent a closing edge 324 of the opening 322 of the valve sheet 320 from snagging during closing of the vent, or pulling of the valve sheet 320 in a direction P.

Figure 8:
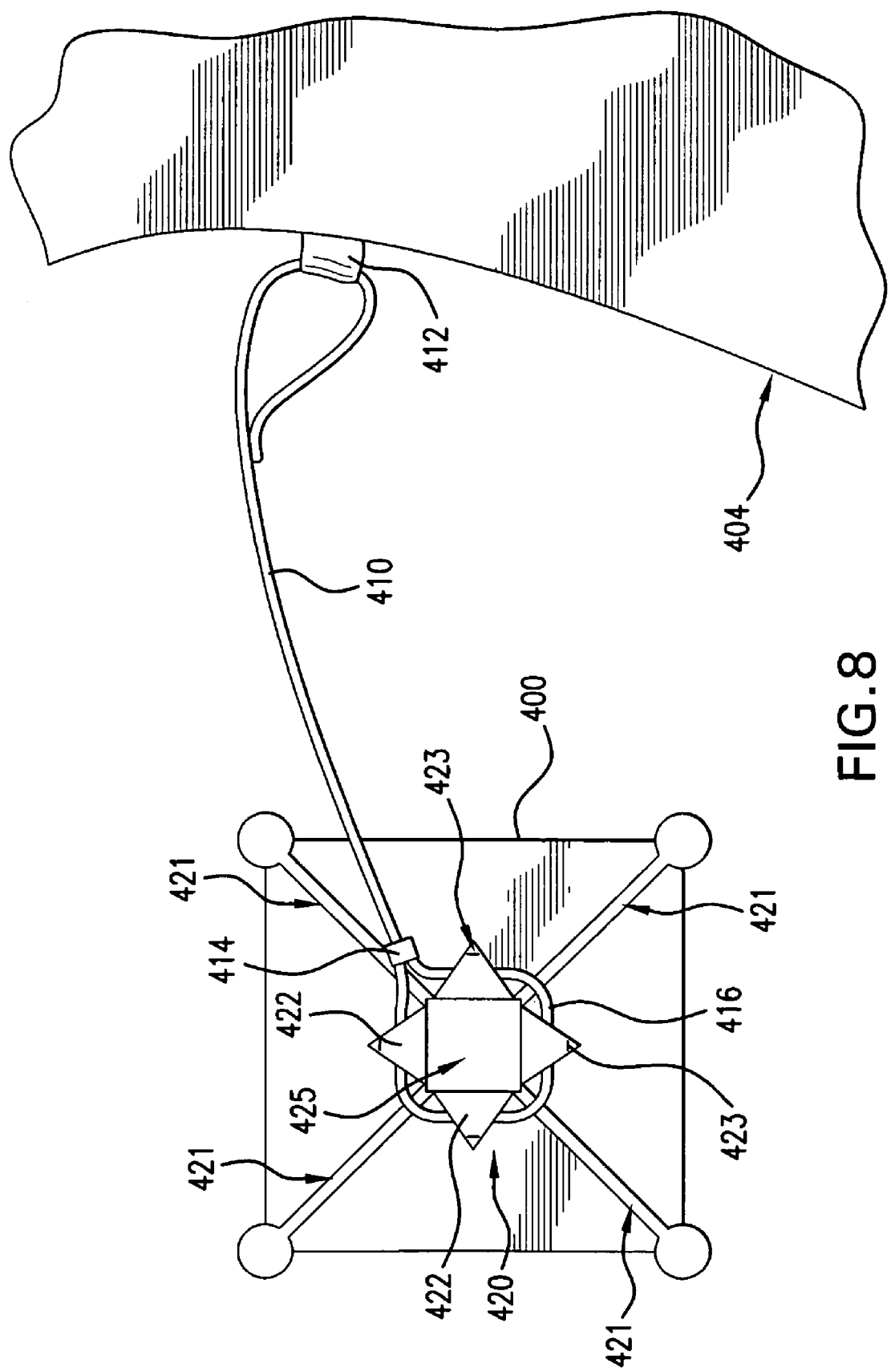
FIG. 8 is a view of another embodiment of a passive vent assembly for an airbag according to another embodiment of the invention.

FIGS. 8 and 9 show another embodiment of the invention in which the vent opening in a cushion fabric 400 is a cross vent 420 type opening. As shown in FIG. 8, a valve control member 410 extends from an anchor 412 on a cushion surface 404 to a loop 416. The valve control member 410 may comprise plastic, such as nylon, or any other suitable material. The control member 410 may take the form of a line, cord, string, or wire, for example. The loop 416 encircles flaps 422 of the cross vent 420. The cushion fabric 400 includes slits 421 in a cross-type pattern that when pulled back form an opening 425. The flaps 422 are folded back over the loop 416 and stitched back to the cushion fabric 400 along stitched seams 423, which maintain the position of the loop 416.

The valve control member 410 also includes a closure device 414, which enables the loop 416 to tighten, thus closing the opening 425. The loop 416 tightens when the airbag reaches full deployment. In full deployment, the stitched seams 423 can be broken, thus allowing for the flaps 422 to close the opening 425.

FIGS. 10(a) and 10(b) show an embodiment of a closure device 434. The closure device 434 is similar to a pull-tie and includes ridges 436 and a moveable section 438. The moveable section 438 slides over the ridges when sufficient force is applied to the valve sheet, in order to close a vent.

FIGS. 10(c) and 10(d) show another embodiment of a closure device 444. In this embodiment, the closure device is similar to a cable clamp. The closure device 444 includes a cable section 448 and a clamp 446. During operation, when the airbag deploys, the cable section 448 is pulled, thus moving the clamp 446 toward the opening 425. When the clamp 426 completely tightens the loop in the cable section 448, the flaps 422 are pulled, breaking seams 423 and flipping the flaps 422 over to block the opening 425.

FIGS. 11 and 12(a)-12(c) illustrate another embodiment of a vent valve 515. The vent valve 515 includes a vent guide 520 for an airbag 500. The airbag 500 includes a plurality of fabric panels 510 which form an inflatable chamber. Each side fabric panel 510 includes an opening 514. An opening 514 is positioned on the left and right sides of an occupant during deployment of the airbag 500 such that no vented gas will impinge an occupant directly. FIG. 11 illustrates only one fabric panel 510 and one opening 514 for sake of clarity.

The vent guide 520 includes a patch 540 positioned in a pocket 530 to align the patch 540 with the opening 514. The patch 540 is attached by an attachment point 546 at one end of the airbag 500 at an internal surface 512. The other end of the patch 540 forms the pocket 530. The patch 540 is folded or rolled over at 548. The pocket 530 is attached to the fabric panel 510 at seams 532. The patch 540 extends from the pocket 530, is folded under at 548 and extends underneath the pocket 530. The patch 540 is stitched into position by tacking stitches 544. The pocket 530 includes a pocket opening 534 that aligns with a patch opening 542 and cushion opening 514 prior to deployment of the airbag 500.

If, during inflation, the airbag 500 impinges upon an object that prevents the airbag 500 from fully deploying, the patch 540 remains in the same position as shown in FIG. 12(b). In this position, the valve 515 remains open, allowing air to escape out of the cushion opening 514. However, if the airbag 500 fully deflates, the patch 540 is pulled by the shape and inflation of the airbag 500, breaking tack stitches 544 and pulling the patch 540 so that the patch opening 542 is no longer aligned with the opening 514 and pocket opening 534. This position closes the valve 515.

Figure 13B:
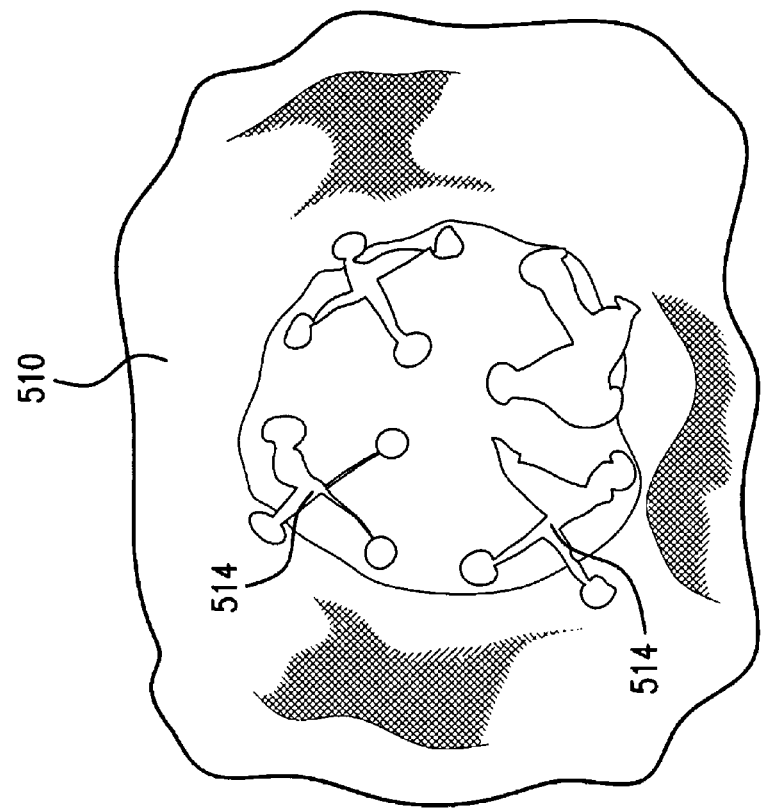
FIGS. 13(a) and 13(b) are views of the airbag of FIG. 11 showing an outside surface of a fabric panel with the vent.
Figure 13A:
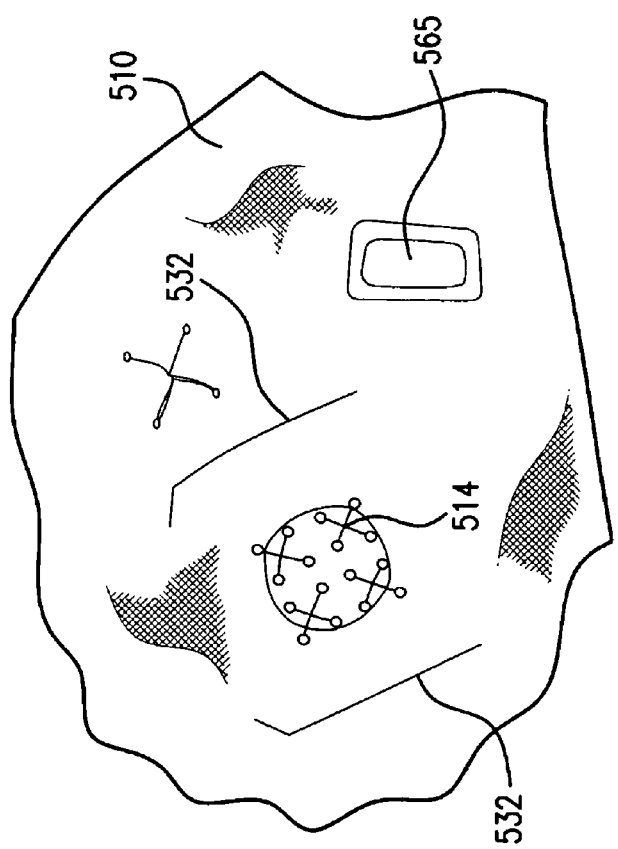
Figure 14:
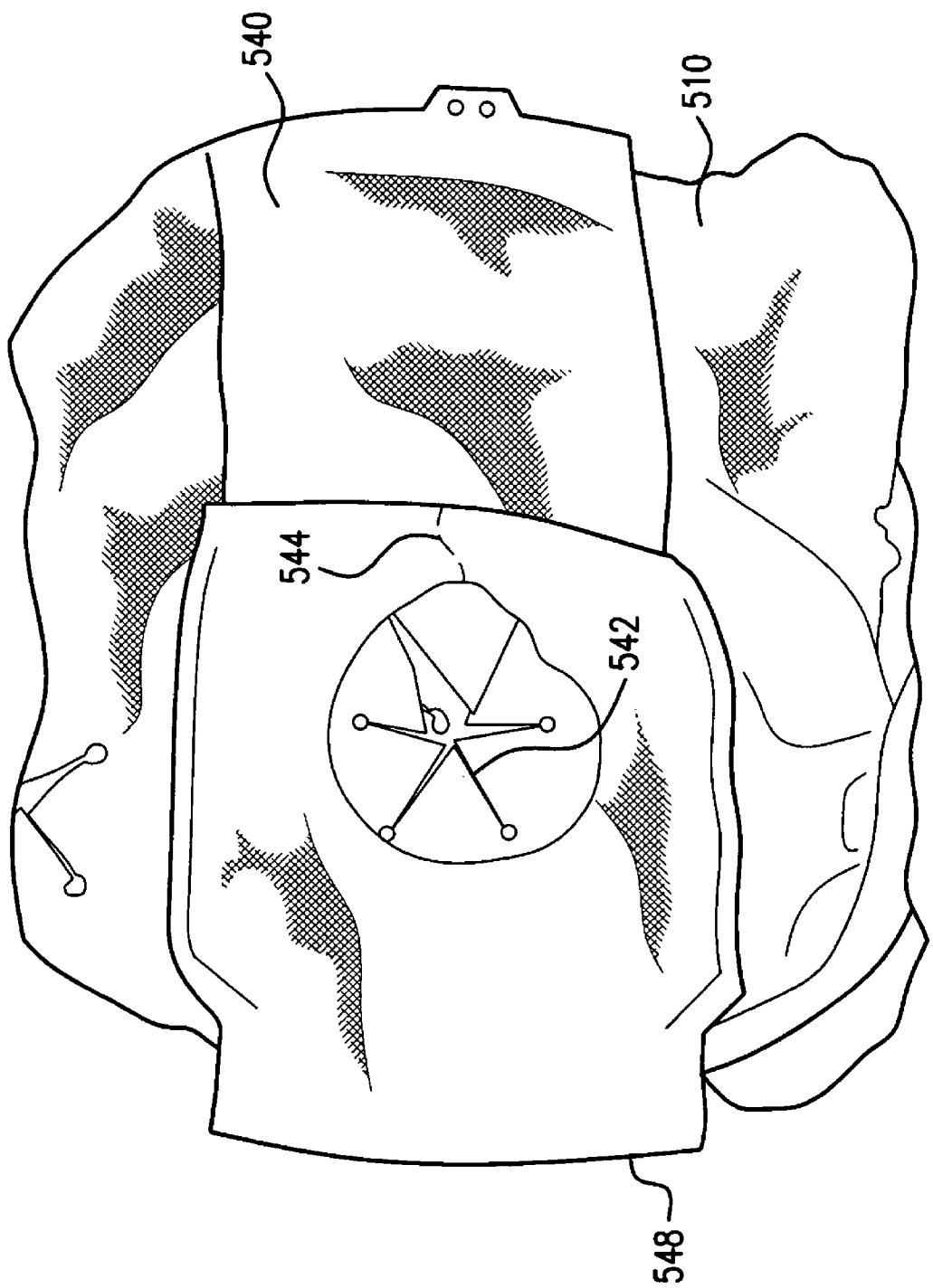
FIG. 14 is a view of an inside surface of a panel of the airbag of FIG. 11 showing the vent guide.
Figure 15:
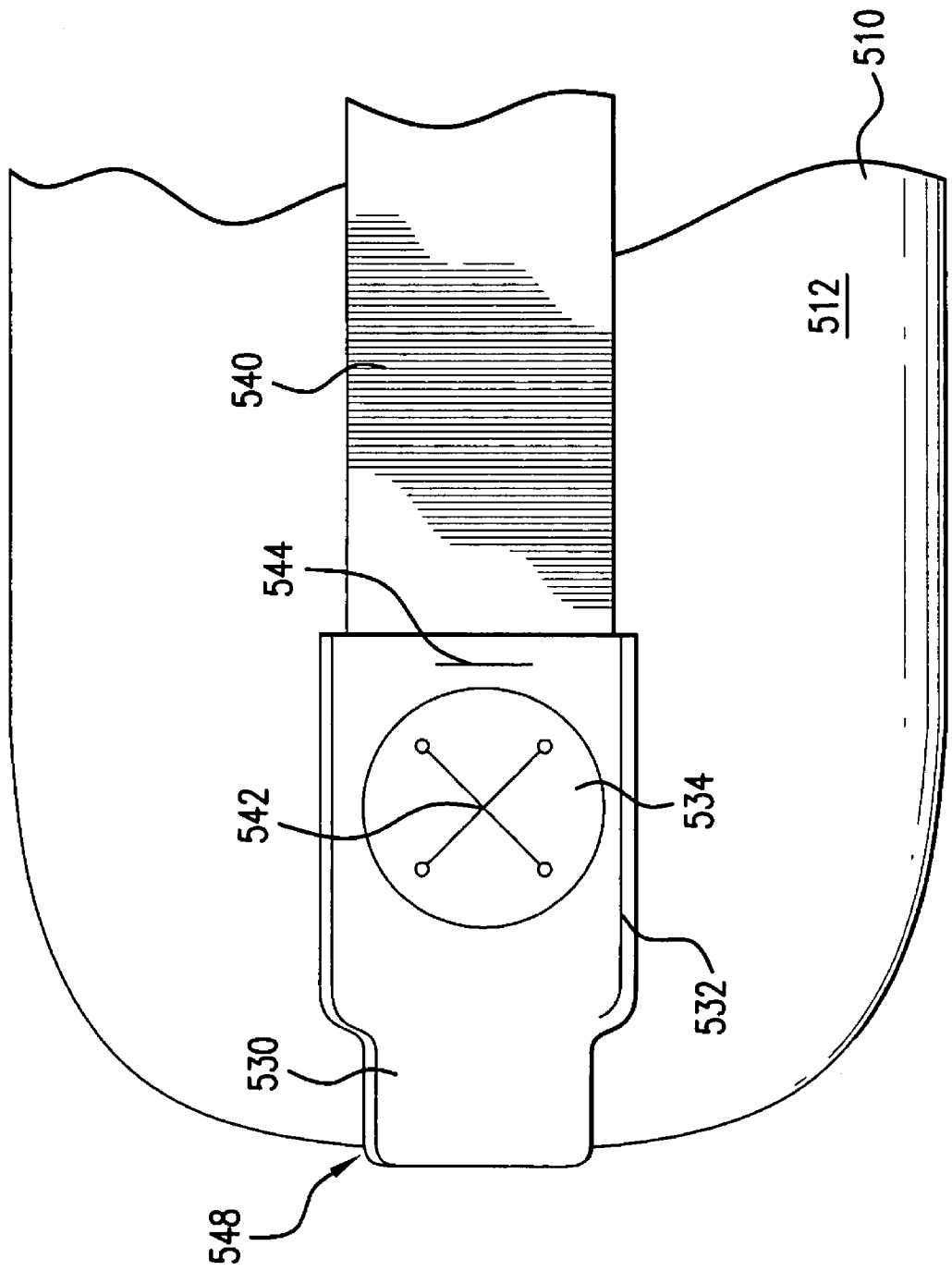
FIG. 15 is a view of an inside surface of the airbag panel of FIG. 11 showing the vent guide.

FIGS. 13(a) and 13(b) illustrate an outside surface of the airbag panel 510. The stitch seams 532 attaching the pocket 530 to the panel 510 are visible, as well as the opening 514. FIG. 13(b) is a close-up view of the opening 514. The opening 514 may comprise a plurality of X-vents (as shown), a single opening or hole, or any other suitable shape. FIGS. 14 and 15 are additional views of the vent guide 520.

The airbag 500 can also include an additional vent opening 560, which remains open during inflation of the airbag 500, and an internal tether 565.

FIGS. 16-20 illustrate another embodiment of a passive venting apparatus 900 which may be used in conjunction with an airbag 800. The airbag 800 includes at least one airbag vent valve 810 including a first vent opening (not shown) in the airbag cushion. However, the airbag 800 can include additional vents which can open as the airbag 800 deploys. Valve 810 begins in an open position as the airbag 800 initially begins to deploy and can close as the airbag 800 extends towards an occupant that is seated correctly. If the occupant is seated out-of position (incorrectly) or if the airbag 800 contacts an obstruction, the vent valve 810 will remain open and discharge inflation gases.

The passive venting apparatus 900 is configured to be integrated with a valve sheet extension 850 that can be incorporated into the airbag with minimum impact on existing manufacturing processes. The valve sheet extension 850 can extend from a point along an inside surface 820 of the airbag 800 to a second point on the inside surface 820. The valve sheet extension 850 is generally slack before the airbag 800 begins deployment and, as the airbag 800 reaches full deployment, the valve sheet extension 850 becomes taut to control the shape of the deployed airbag 800.

A connecter 860 connects or joins the extension 850 with the passive venting apparatus 900. The connector 860 may be a separate connecting device, such as a strap, ring, buckle, or any other suitable device, sewn stitches, or an extension of material forming the valve sheet extension 850 and the passive venting device 900. The connector 860, passive venting apparatus 900 and extension 850 may be integrally or discretely connected. For example, the valve sheet extension 850 can be an integral extension of a valve sheet or strap.

Figure 16:
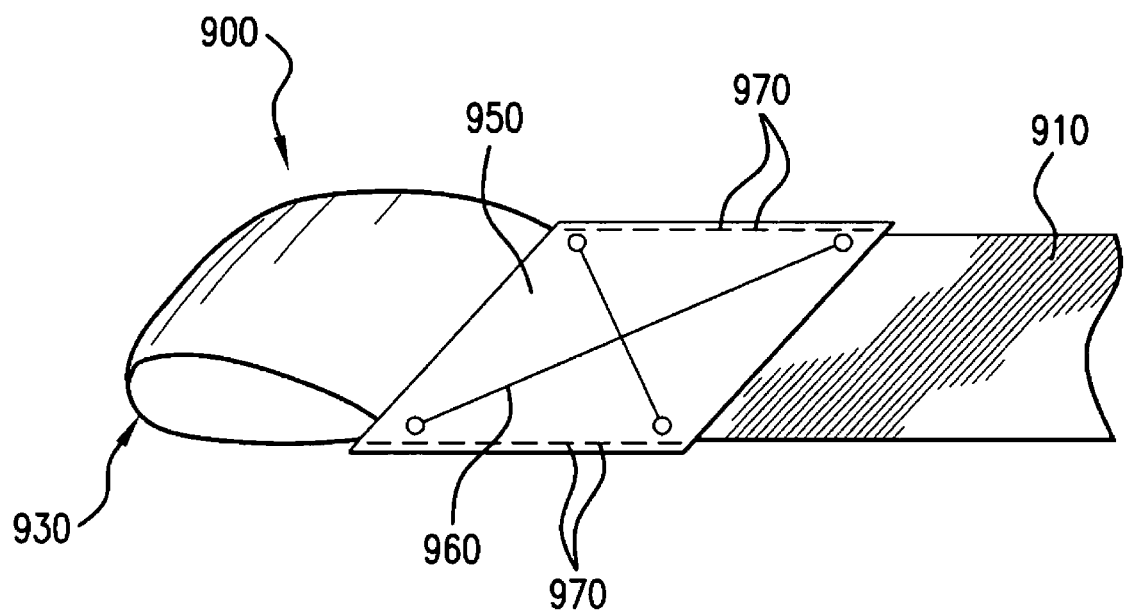
FIG. 16 illustrates a view of a venting apparatus according to an embodiment of the invention.

As shown in FIG. 16, the passive venting apparatus 900 includes a strap 910 extending from a first end to the connector 860 and a sleeve 950. The strap 910 includes a strap opening 920 (second vent opening) that is positioned on top of the airbag opening (first vent opening) such that the strap vent 920 aligns with the airbag opening. The sleeve 950 is positioned over a portion of the strap 910 and is configured to maintain the position of the strap 910. The sleeve 950 includes a sleeve vent opening 960 that is initially aligned with the strap vent opening 920 and airbag opening (first vent opening) such that the airbag valve 810 is opened and the first vent opening is uncovered to allow inflation gases to escape. The sleeve 950 is connected to the airbag 800 by sewn stitches 970 or by any other suitable manner.

Figure 17:
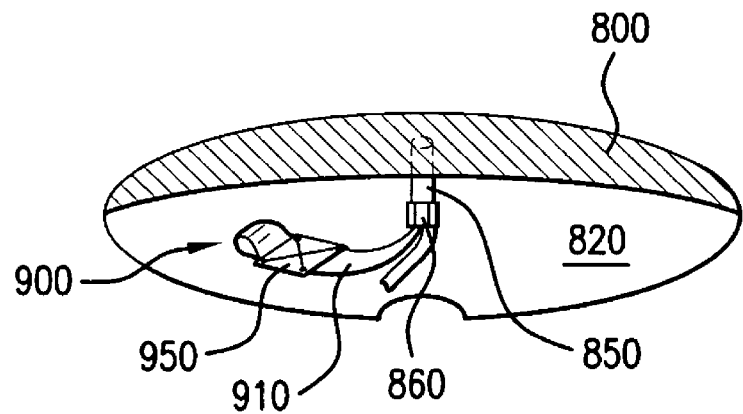
FIG. 17 illustrates the venting apparatus of FIG. 16 in conjunction with an airbag, in which a sectional view of the airbag is shown.

As shown in FIG. 17, the strap 910 extends from the connector 860, slides under the sleeve 950 and loops around at loop 930. A second end of the strap 910 may be attached to the sleeve 950, the airbag 800, or looped in any other suitable manner, such that when the airbag 800 deploys and the extension 850 tightens, the strap 910 is able to slide with the movement of the extension 850.

Figure 20:
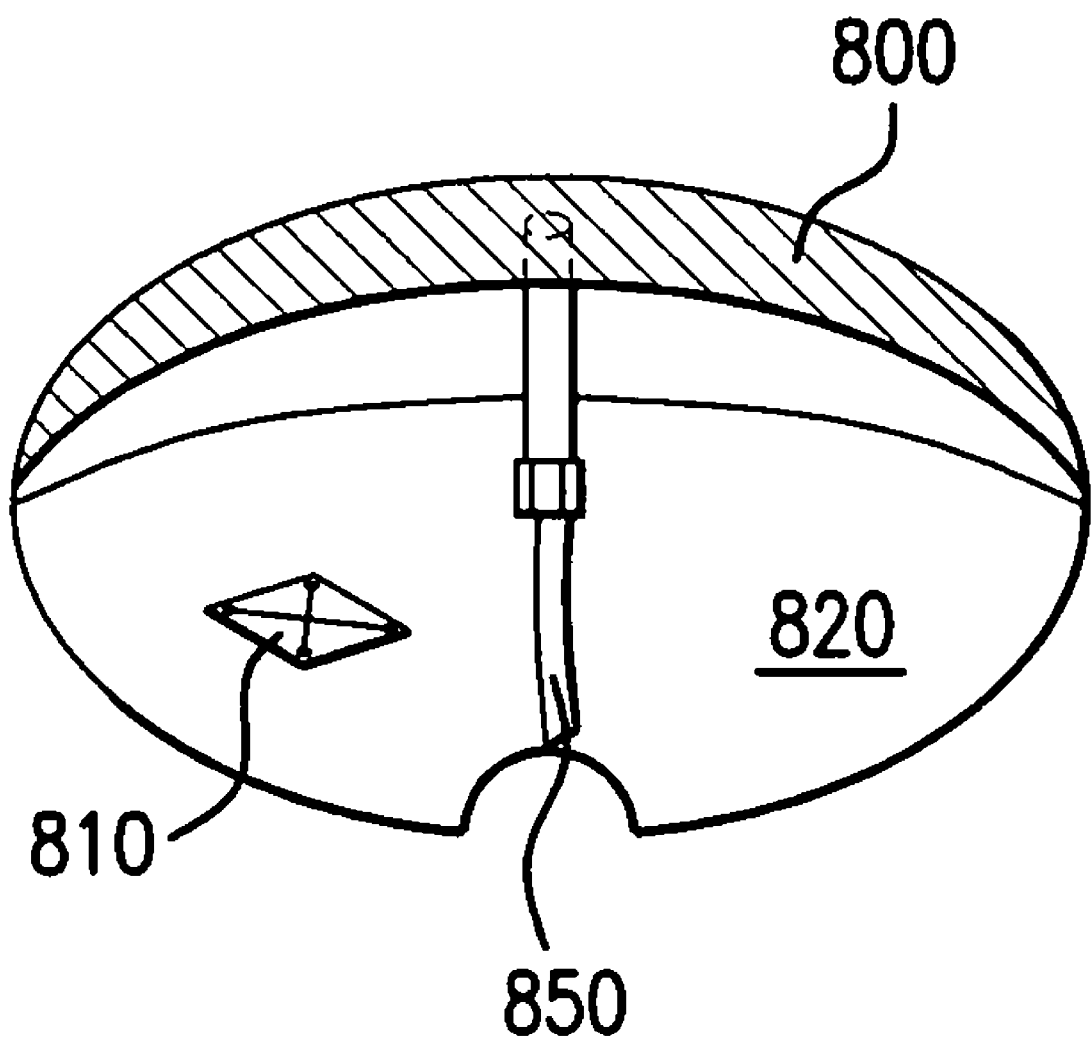
FIG. 20 is a sectional view of an airbag illustrating the airbag vent in which the venting apparatus is not shown for sake of clarity.

FIG. 18 illustrates the passive venting apparatus 900 after the airbag 800 deploys and the extension 850 tightens, thus pulling the strap 910. The strap 910 is pulled out from the sleeve 950 such that the strap vent opening 920 is no longer aligned with the sleeve vent opening 960. In this position, the airbag valve 810 is closed, preventing the escape of inflation gases out of the first vent opening. FIGS. 19 and 20 illustrate the passive venting apparatus 900 in conjunction with the extension 850, after the airbag 800 has fully deployed.

It will be recognized that the airbag 800 may have a plurality of valves 810, airbag cushion openings, and/or passive venting apparatuses 900.

Figure 21:
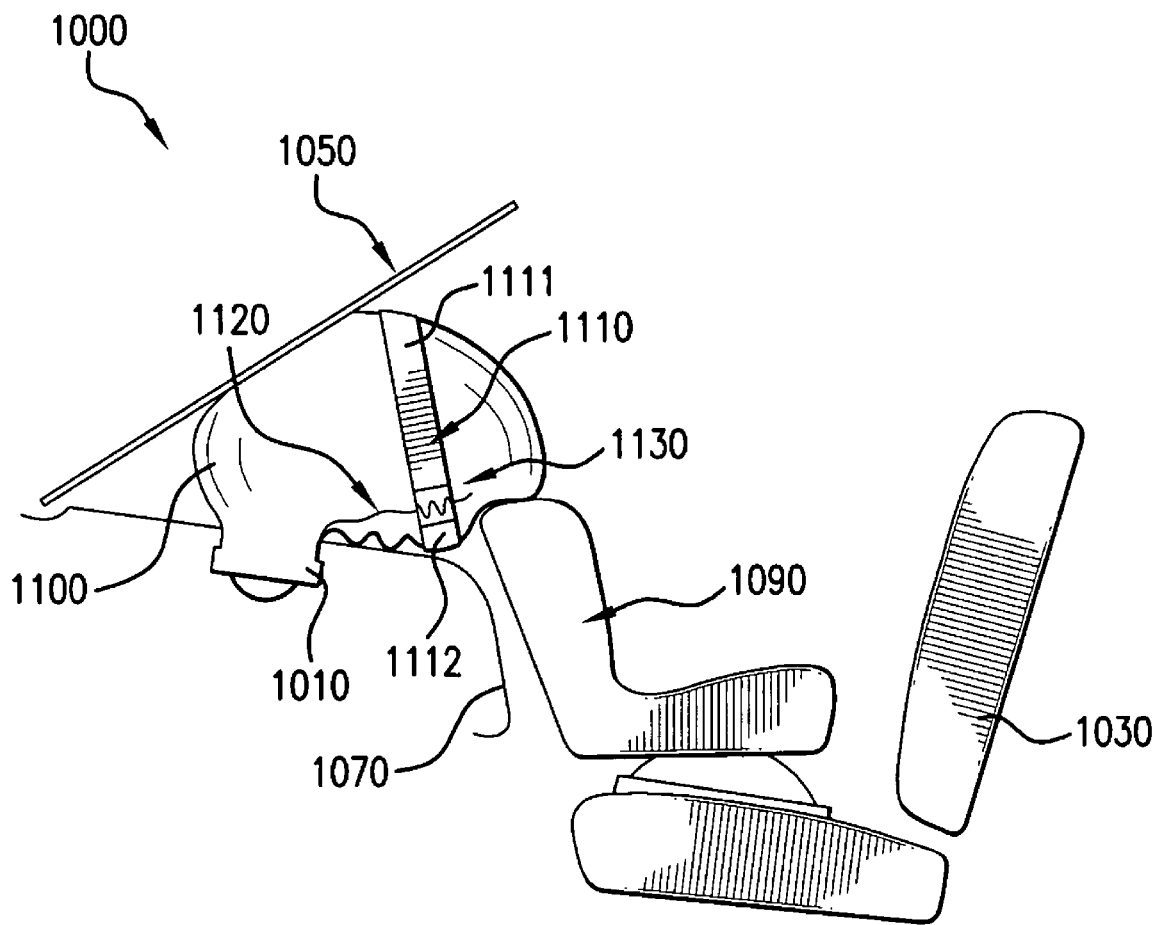
FIG. 21 is a view of an airbag apparatus with passive tether release according to another embodiment of the invention in which the tether remains intact.
Figure 22:
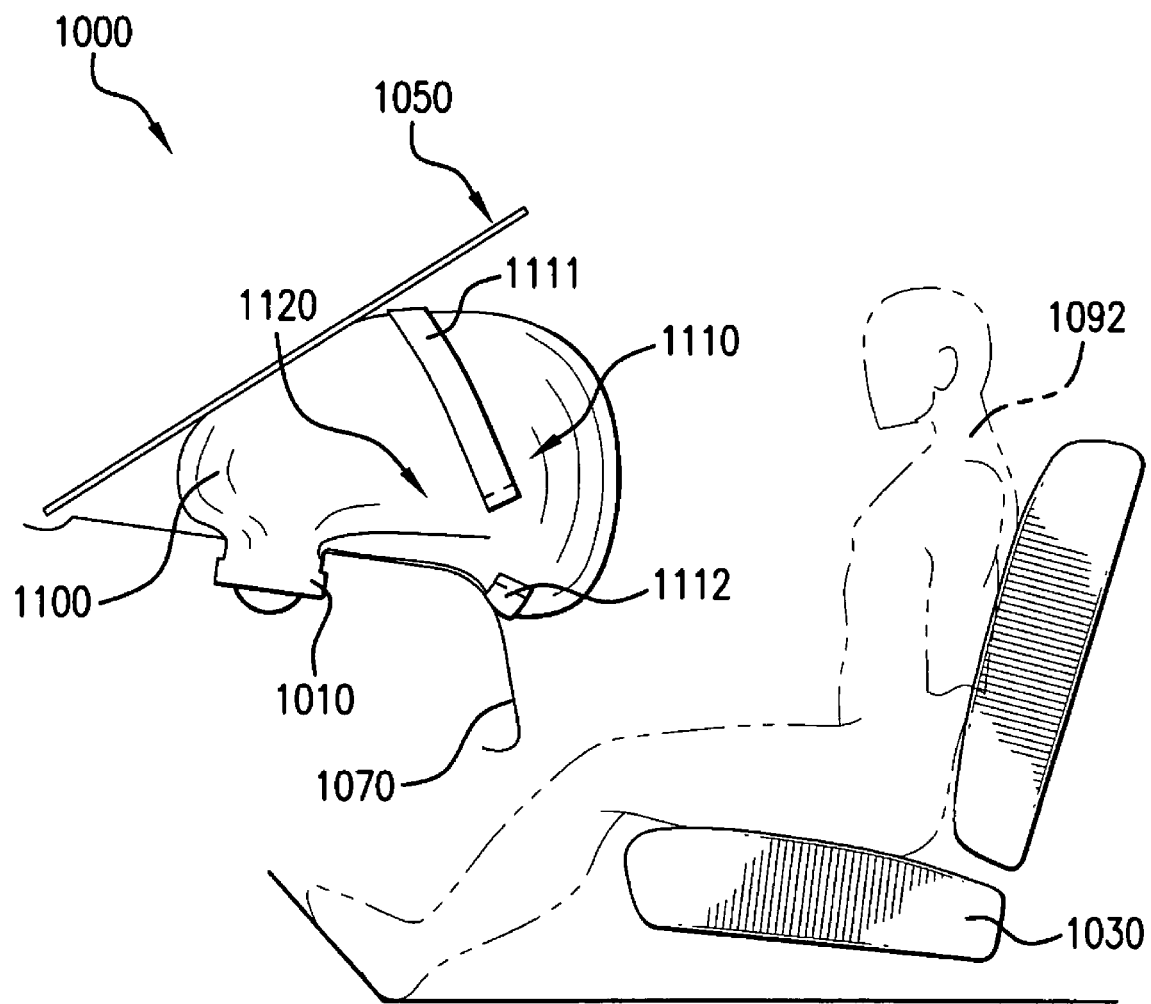
FIG. 22 is a view of the airbag apparatus of FIG. 21 after the tether has been released.

FIGS. 21 and 22 illustrate another embodiment of the invention in which an airbag apparatus includes a releasable passive tether device. The passive tether device is configured to provide a controlled or restricted airbag cushion shape when the airbag is inflated near a rear facing infant seat (RFIS) or an out of position (OOP) occupant. The passive tether device also allows the airbag to inflate normally in the absence of a RFIS or OOP occupant.

It is an object of the invention to design an airbag that deploys in such a manner to automatically protect a RFIS or OOP occupant without relying on outside electronic sensors or controls.

FIG. 21 illustrates an airbag apparatus 1000 with an airbag 1100 that deployed in the presence of a RFIS 1090. The airbag 1100, in this embodiment, is a passenger side airbag that deploys out of an instrument panel 1070 and toward a vehicle windshield 1050.

The airbag 1100 comprises a releasable passive tether 1110, a locking cable 1120 (anchor thread) and a releasable attachment mechanism 1130. The tether 1110 is a two part, 1111 and 1112, vertical tether positioned in such a manner that it restrains the airbag and prevents the airbag from deploying downward between the instrument panel 1070 and the back of the RFIS 1090.

The locking cable 1120, when pulled laterally, allows the first part 1111 and second part 1112 of the tether 1110 to separate. The locking cable 1120 is configured to have a length that allows the locking cable 1120 to remain connected and in a slack condition if the front of the airbag 1100 (and possibly the tether 1110 itself) impacts a RFIS 1090 or OOP occupant during early deployment. In this case, first and second parts 1111, 1112 of the tether 1110 remain connected and prevent a substantial portion of the airbag 1100 from deploying downward between the RFIS 1090 or OOP occupant and instrument panel 1070. The restraint of the airbag 1100 lowers acceleration forces on the back of the RFIS 1090 and can lower potential head and chest accelerations of an occupant.

A distal end of the first part 1111 and a distal end of the second part 1112 may be connected to the airbag fabric panel (s) directly or indirectly by stitching or any other suitable mechanism. Alternatively, one or both of the distal ends of the first and second parts 1111, 1112 may be connected to the housing 1010 by any suitable manner.

The locking cable 1120 may be attached at one end, directly or indirectly, to the airbag 1100 or the housing 1010. The opposite end of the locking cable 1120 is connected to the tether 1110. The locking cable 1120 may be a cable, thread, cord, or any other suitable device. The locking cable 1120 may be made of any suitable material.

The releasable attachment mechanism 1130 may be any suitable mechanism to initially keep the first part 1111 and second part 1112 of the tether 1110 together and to release or separate the two parts 1111 and 1112 when appropriate. For example, the releasable attachment mechanism 1130 may comprise loops, clamps, releasable/tear stitching, a moveable member, a shear pin, or any other suitable mechanism. For another example, the proximal ends of the first and second parts 1111 and 1112 may join together to form a slot to receive the locking cable 1120. The locking cable 1120 may lock or attach the three parts (1111, 1112 and 1120) together. When the airbag 1100 does not impact an object, such as an RFIS 1090, the locking cable 1120 is pulled out of the slot and releases the first part 1111 from the second part 1112.

The releasable attachment mechanism 1130 may be configured such that the proximal end of the first part 1111 connects to the locking cable 1120 and the proximal end of the second part 1112 connects to the locking cable 1120 such that the first part 1111 and second part 1112 do not directly connect. Alternatively, the proximal ends of the first and second parts 1111, 1112 may directly connect and the locking cable 1120 may be attached to one or both parts 1111 and/or 1112.

FIG. 22 illustrates the airbag apparatus 1000 in situation in which the airbag 1100 is able to deploy normally, without impacting an RFIS 1090 or OOP occupant. In FIG. 22, an occupant 1092 is in position on a vehicle seat 1030. In this situation, the expanding airbag 1100 pulls the locking cable 1120 beyond the range in which the locking cable 1120 can remain slack. The locking cable 1120 is pulled out of the tether 1110 (or otherwise removed from the tether 1110) and the first part 1111 and second part 1112 separate, thus releasing the airbag to continue expanding to a fully deployed condition.

Alternatively, the airbag apparatus 1000 may be configured such that a tether is used without a locking cable. In this embodiment, if the airbag 1100 impacts a RFIS or OOP occupant, the tether 1110 remains intact. If, on the other hand, the airbag 1100 does not impact an RFIS or OOP occupant, the airbag 1100 continues to deploy normally and the nature of the deploying airbag 1100 pulls the tether 1110 and releases the tether 1110 and separates the first part 1111 from the second part 1112. In this embodiment, the impact between the airbag 1100 and the RFIS or occupant prevents the tether 1110 from being placed under the force required to separate the two parts 1111, 1112.

It will be recognized that the tether 1110 may be a vertically oriented tether, such as shown in FIGS. 21 and 22, or the tether may be oriented in any other suitable direction, such as horizontally, diagonally, or any other angle. The tether 1110 and locking cable 1120 may be of any suitable shape, length or made of any suitable material. A plurality of tethers 1110 may be used.

FIGS. 23 to 27 illustrate another embodiment of an airbag 1200 with a passive venting assembly. In this embodiment, a valve sheet 1210 is attached to a fabric panel 1201 of an airbag 1200. The fabric panel 1201 includes a first vent opening 1205 to enable inflation fluid to escape out of the airbag 1200 during deployment. FIGS. 23 to 27 illustrate a first (airbag) vent opening 1205 that comprises a plurality of small vent openings. It will be recognized that the airbag vent opening 1205 may comprise any suitable number, shape and size of openings.

The valve sheet 1210 includes a second vent opening 1224 that is movable relative to the first vent opening 1205. The second vent opening 1224 is shown for exemplary purposes with two discrete openings. It will be recognized that the second vent opening 1224 may comprise any suitable number, shape and size of openings.

The valve sheet 1210 is secured (fixed) at opposite ends to the fabric panel 1201. The valve sheet remains fixed to the airbag 1200 during and after inflation of the airbag 1200. A distal end 1212 of the valve sheet 1210 is fixed to the fabric panel 1201 away from the first vent opening 1205 by sewn stitches or any other suitable manner. The opposite end 1214 of the valve sheet 1210 is fixed closer to the first vent opening 1205 by sewn stitches or any other suitable manner. During inflation of the airbag 1200, the valve sheet 1210 is stretched or pulled, thus moving the valve sheet 1210 and second vent opening 1224 relative to the first vent opening 1205 and covering the first vent opening 1205 to thereby close the vent valve.

The airbag 1200 may also include a valve guide 1230. The valve guide 1230 guides movement of the valve sheet 1210 relative to the fabric panel 1201. The valve sheet 1210 is capable of sliding between the valve guide 1230 and the fabric panel 1201. The valve guide 1230 is fixed at opposite ends to the fabric panel 1201, such that the distance between the fixed points is greater than the width of the valve sheet 1210 to enable movement of the valve sheet 1210.

Figure 23:
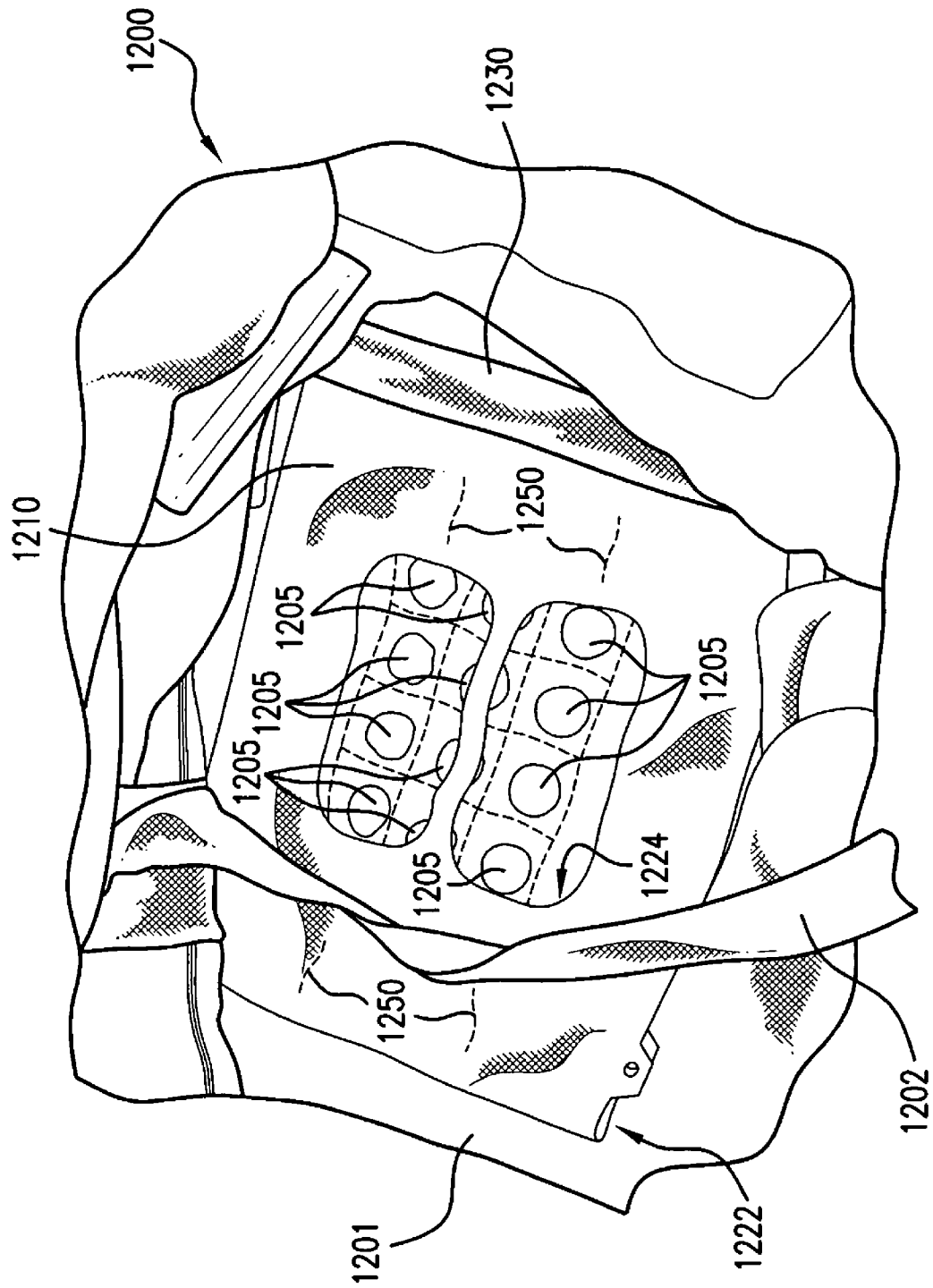
FIG. 23 is a view of a vent valve assembly according to an embodiment including tack stitching.
Figure 24:
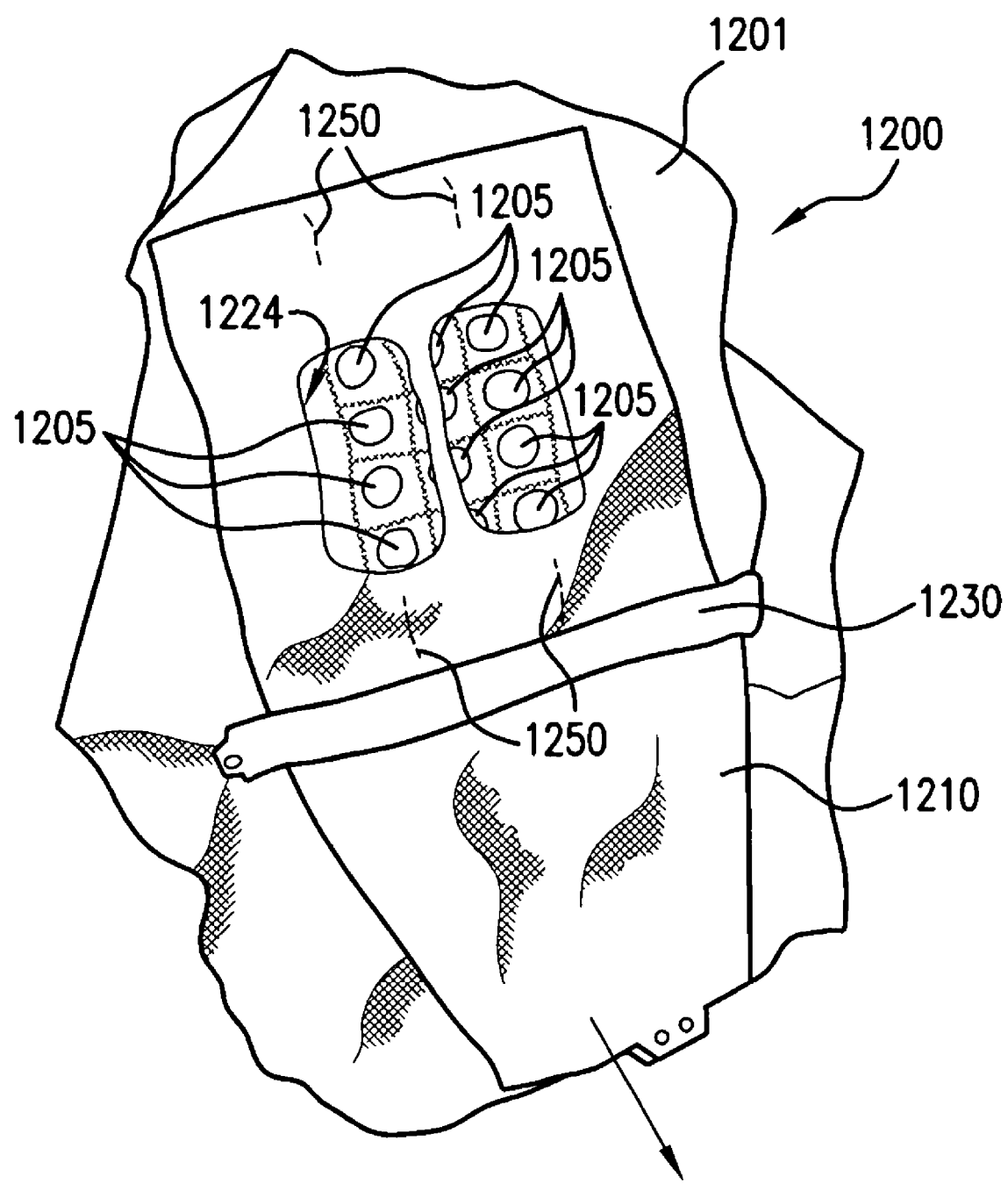
FIG. 24 is a view of the vent valve assembly of FIG. 23.
Figure 25:
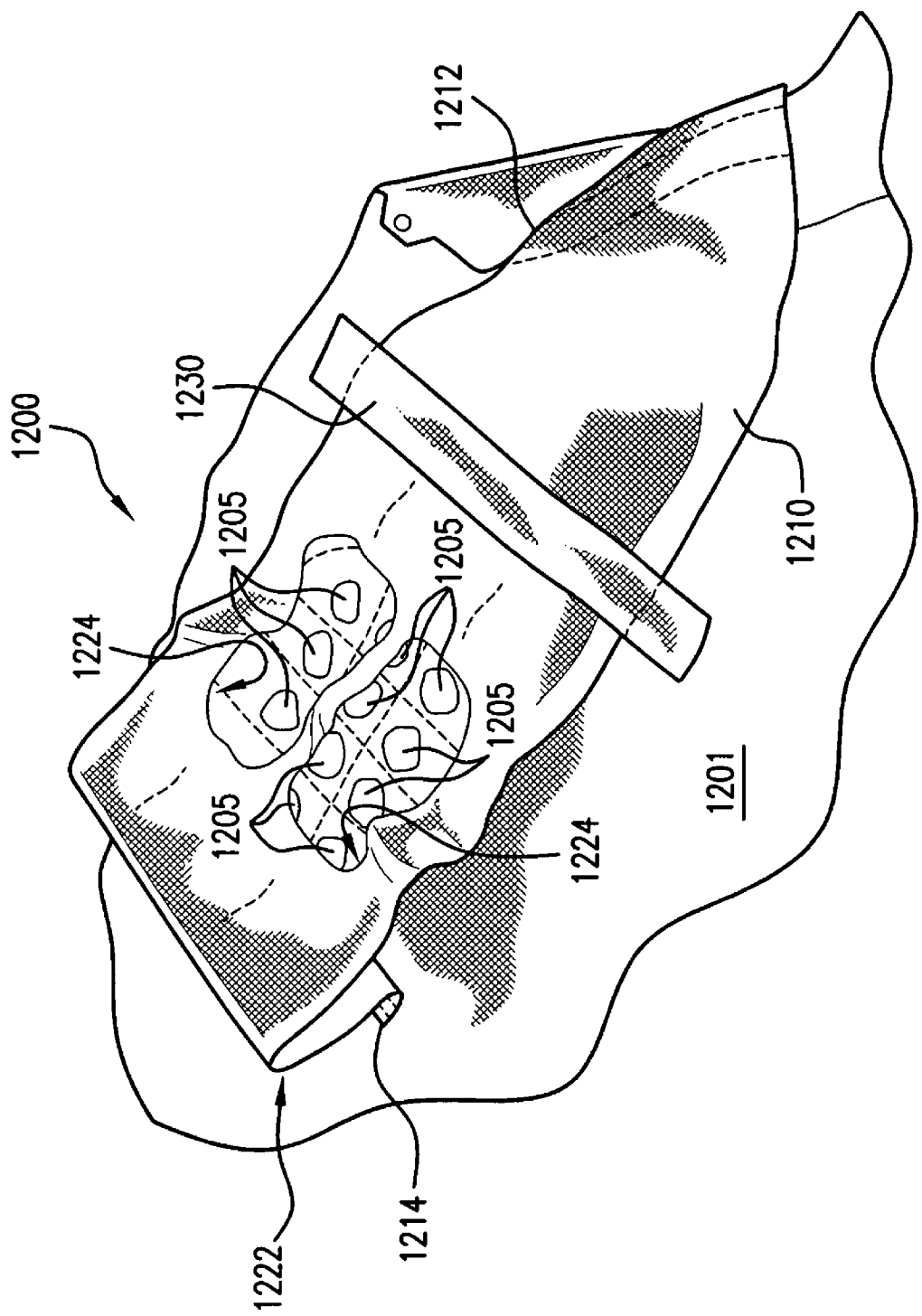
FIG. 25 is a view of the vent valve assembly of FIG. 23 in which the tack stitches are beginning to break during inflation of the airbag.
Figure 26:
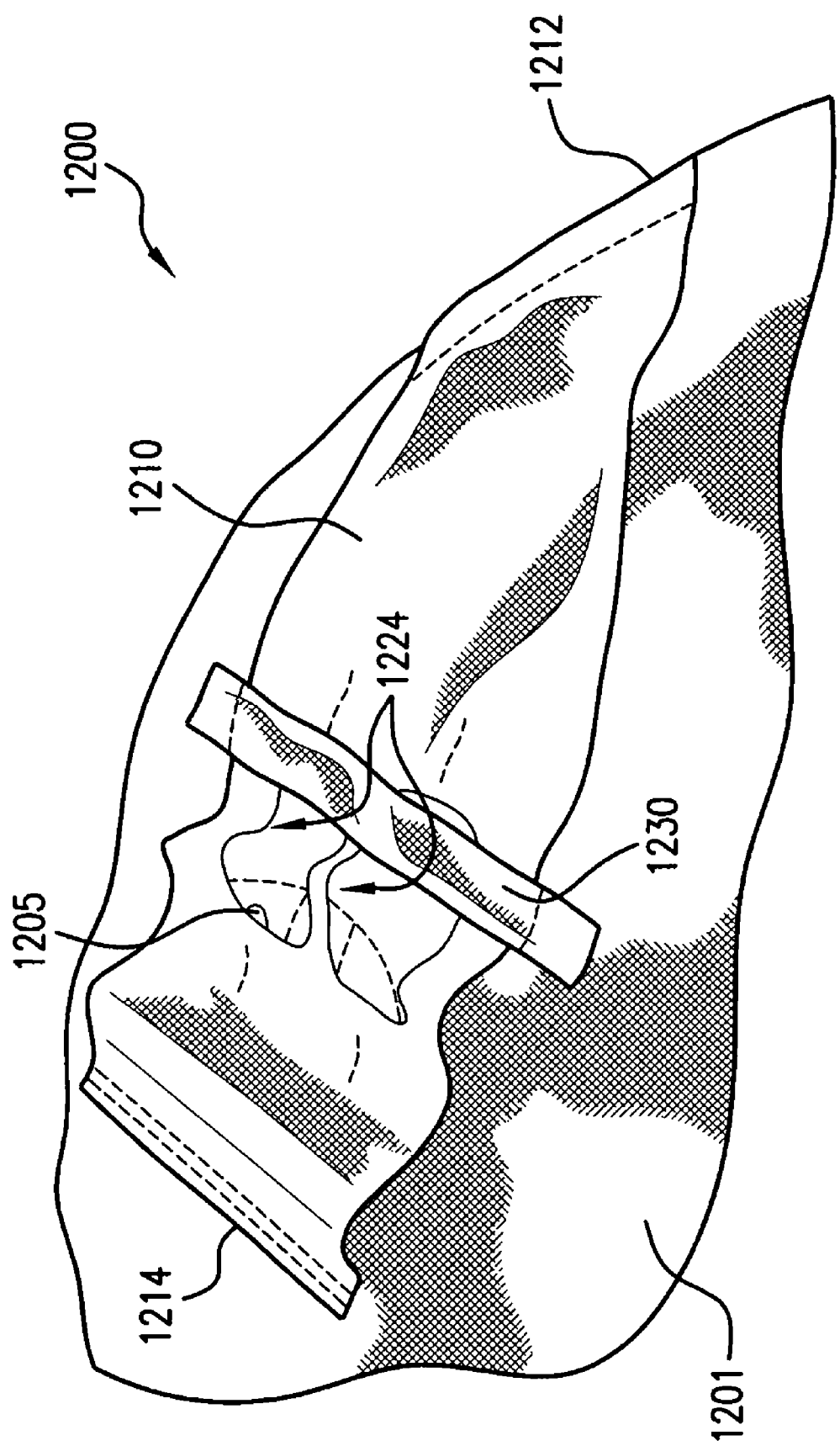
FIG. 26 is a view of the vent valve assembly of FIG. 23 showing the initial covering of a first vent opening during inflation of the airbag.
Figure 27:
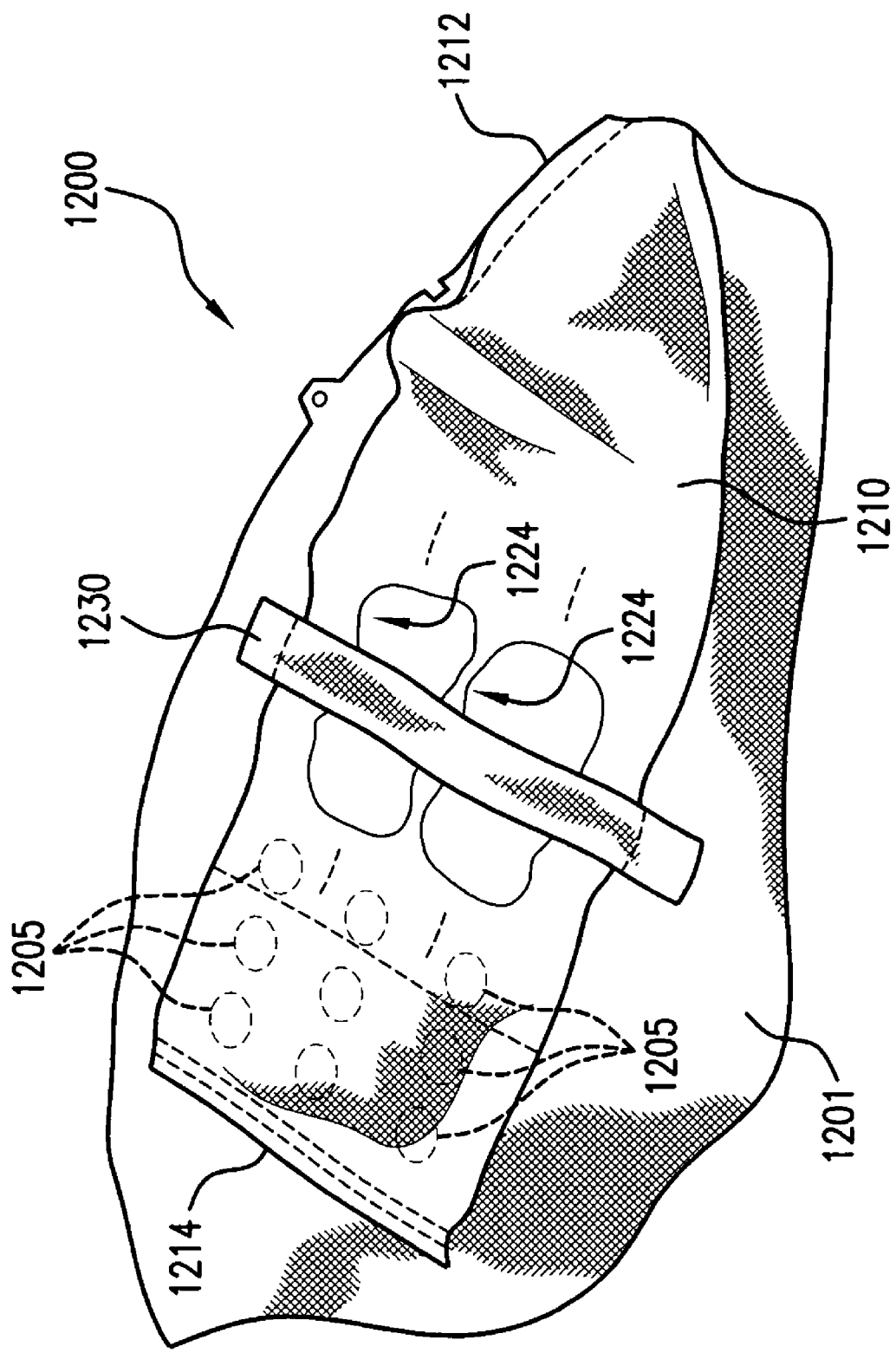
FIG. 27 is a view of the vent valve assembly of FIG. 23 in which the first vent opening is completely covered and the vent is closed.

The valve sheet 1210 includes a folded over section of excess material 1222 that is secured by tack/rupturable stitching 1250. The excess material 1222 section is used to align the second vent opening 1224 with the first vent opening 1205. When the valve sheet 1210 is pulled during inflation of the airbag 1200, the force from the pulling of the valve sheet 1210 ruptures the tack stitching 1250, releasing the excess material 1222 and moving the second vent opening 1224 away from the first vent opening 1205. The valve sheet 1210 may also include additional tack stitching 1250 to hold the position of the valve sheet 1210 such that the vent opening 1205 is uncovered allowing the vent valve to be "open" until a predetermined force is met during inflation of the airbag 1200. For example, the valve sheet 1210 includes tack stitching on a portion on opposite sides of the second vent opening 1224, as shown in FIG. 23.

FIGS. 28 to 31 illustrate an embodiment of the invention with two sections of a valve sheet opening that are pre-scored to break easily during deployment, but also retain the valve sheet in a proper storage location when needed.

Figure 28:
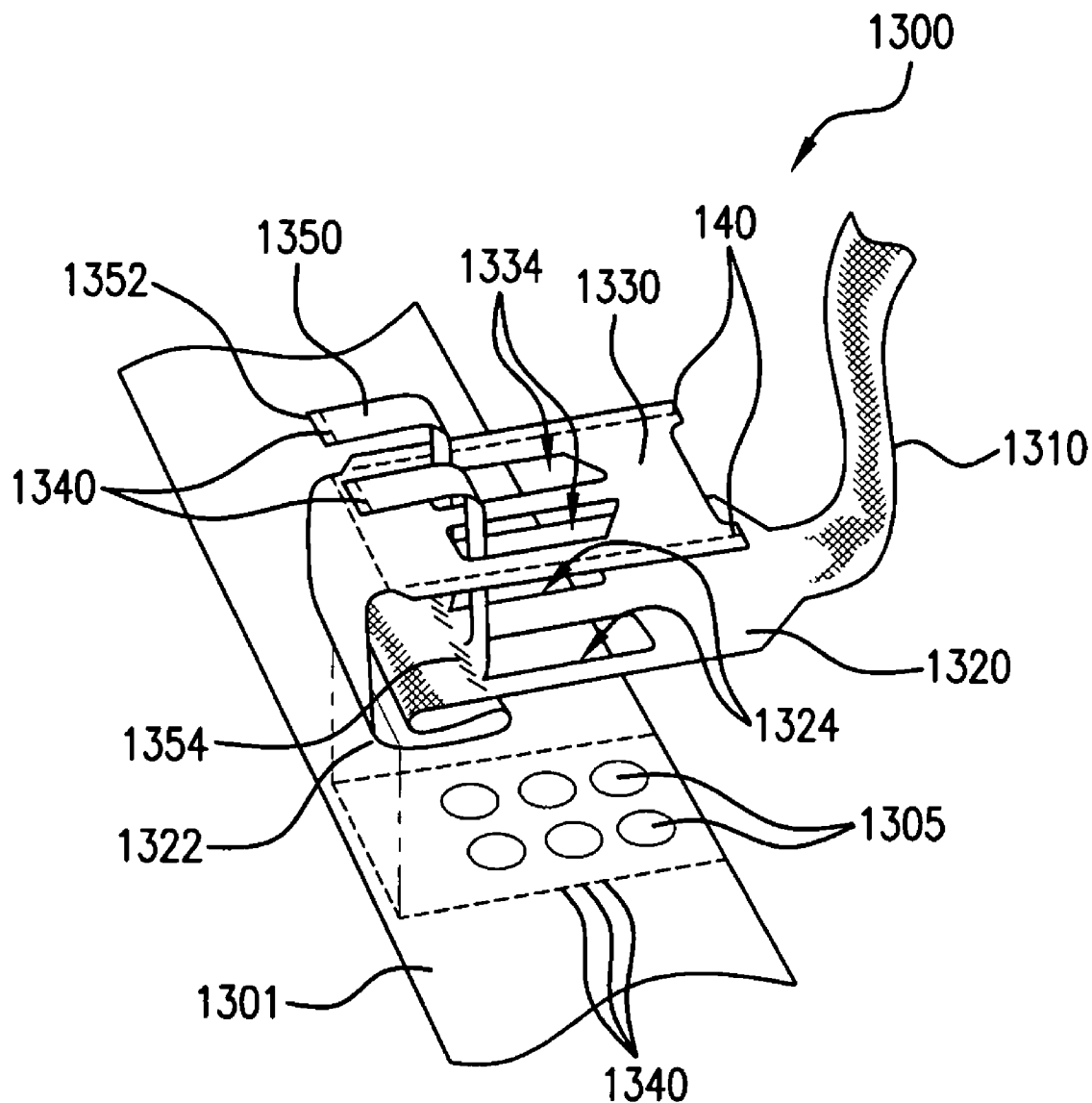
FIG. 28 is an exploded view of a vent valve assembly with tear tabs according to another embodiment of the invention.

FIG. 28 is an exploded, perspective view of an airbag 1301 with a passive venting assembly 1300 utilizing tear zone tabs 1350. The passive venting assembly 1300 includes a vent valve that remains open during initial inflation (which keeps the openings 1305 uncovered) and closes when the airbag 1301 reaches full deployment.

The passive venting assembly 1300 includes a valve sheet 1310 with a main valve sheet portion 1320 and an envelope (pocket) 1330. The valve sheet 1310 is connected at a distal end (not shown) to a portion of the airbag 1301 and at an opposite end to a portion of the airbag 1301 near the airbag openings 1305 via the envelope 130. The envelope 1330 is an integral part of the valve sheet 1310. The envelope 1330 is sewn to the airbag 1301 along sew lines 1340. The envelope 1330 is positioned over a portion of the valve sheet 1320 in order to keep the valve sheet 1320 in a proper location prior to and during inflation of the airbag 1301. Alternatively, the envelope 1330 may be a separate piece attached to the airbag 1301 and/or valve sheet 1310.

The valve sheet 1320 includes valve openings 1324 that are configured to align with the airbag openings 1305. Further, the envelope 1330 also includes envelope openings 1334 that align with the valve openings 1324 and airbag openings 1305. When the airbag 1301 initially inflates, inflation gases can escape out of the airbag 1301 through the envelope openings 1334, valve openings 1324 and airbag openings 1305.

When the airbag 1301 fully deploys, the valve sheet 1320 is pulled tight, thus moving the valve openings 1324 into a position that is no longer aligned with the airbag openings 1305. This movement blocks the airbag openings 1305 and closes the vent valve. Excess valve sheet 1320 is kept in a folded or looped section 1322 during initial deployment, as shown in FIG. 28. As the valve sheet 1320 tightens, the excess portion is unfolded at the folded section 1322 after breakage of tear zone tabs 1350, allowing for the valve sheet 1320 to move.

In order to maintain the location of the valve sheet 1320 during folding, storage and inflation of the airbag 1301, tear zone tabs 1350 are utilized. The tear zone tabs 1350, in which two are shown in the described embodiment, are created from the valve sheet 1320 material removed to form the valve openings 1324. The tear zone tabs 1350 remain attached (integrally or not) to the valve sheet 1320 along a tear region 1354. A distal end 1352 of each tear zone tab 1350 is sewn, along with the envelope 1330, to the airbag 1301 along sew lines 1340.

As the valve sheet 1320 is pulled, a force is applied to the tear region 1354. When the force overcomes a predetermined force, the tear zone tab 1350 is ripped/torn away from the valve sheet 1320, thus allowing for the valve sheet 1320 to block the airbag openings 1305 and close the vent valve.

The tear region 1354 may be formed by pre-scored sections, or by any other suitable manner. The pre-scored sections may be at a 45 degree angle to an edge of the valve openings 1324, such as shown, for example, in FIG. 31. The 45 degree angle creates discontinuous strands or fibers in the tear zone tabs 1350, thus allowing for the tear zone tabs 1350 to break at a predetermined force. Alternatively, the pre-scored or slit sections may be at any suitable angle, such that the strands or fibers in the tear zone tabs 1350 are discontinuous.

Figure 29:
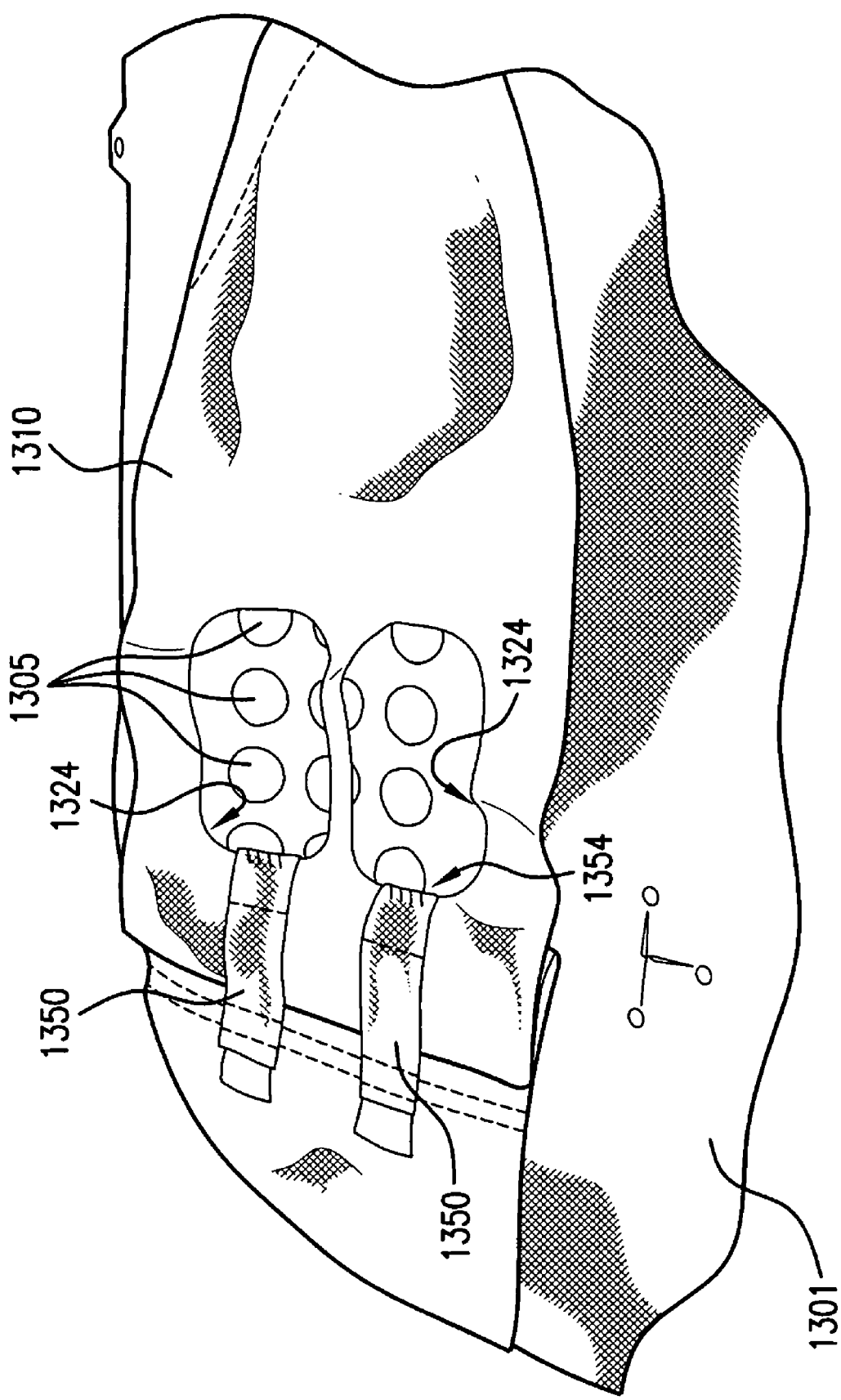
FIG. 29 is a view of an alternative embodiment to the vent valve assembly of FIG. 28 prior to inflation of the airbag.
Figure 30:
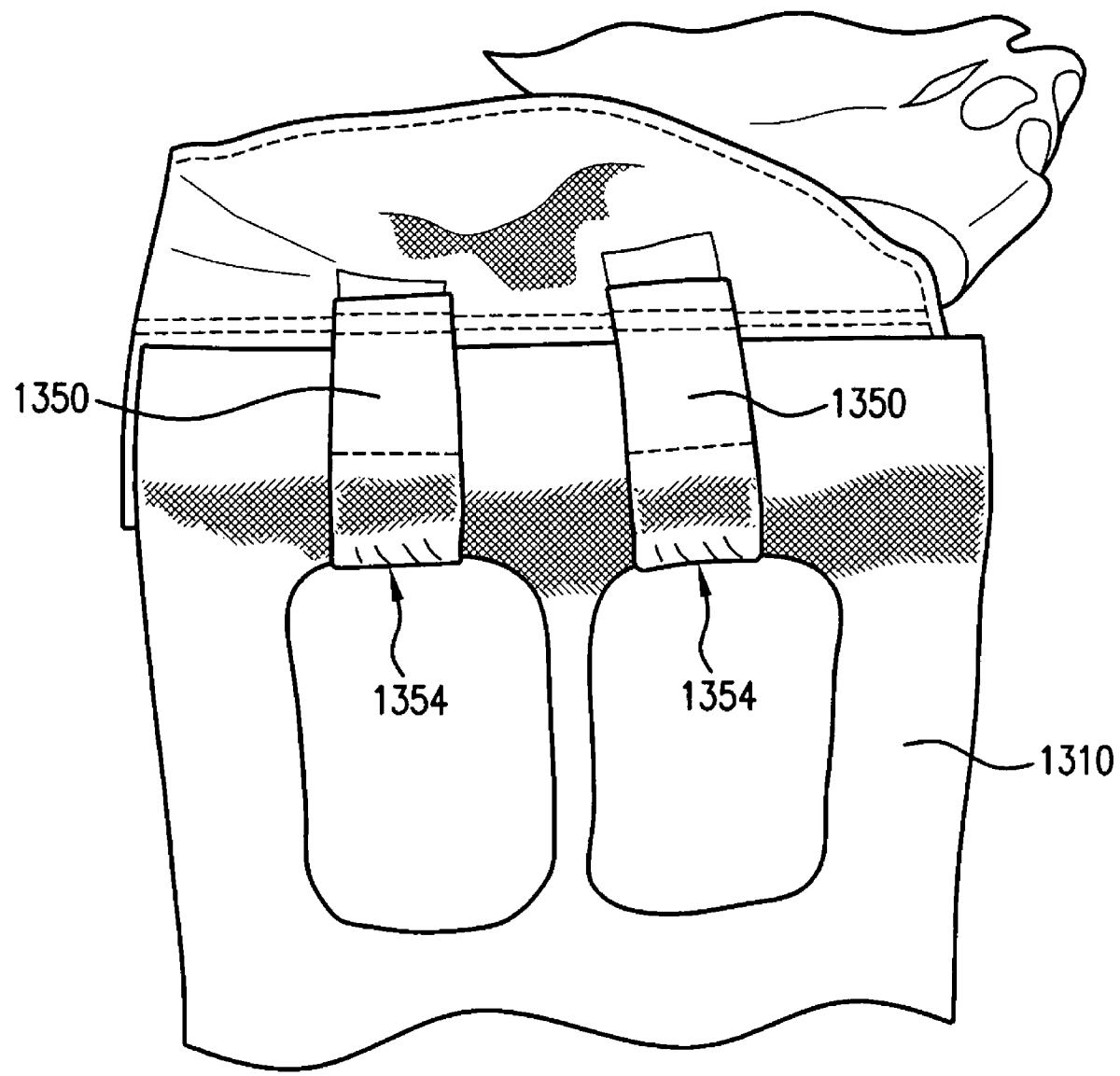
FIG. 30 is a view of the vent valve assembly of FIG. 29 prior to inflation of the airbag.
Figure 31:
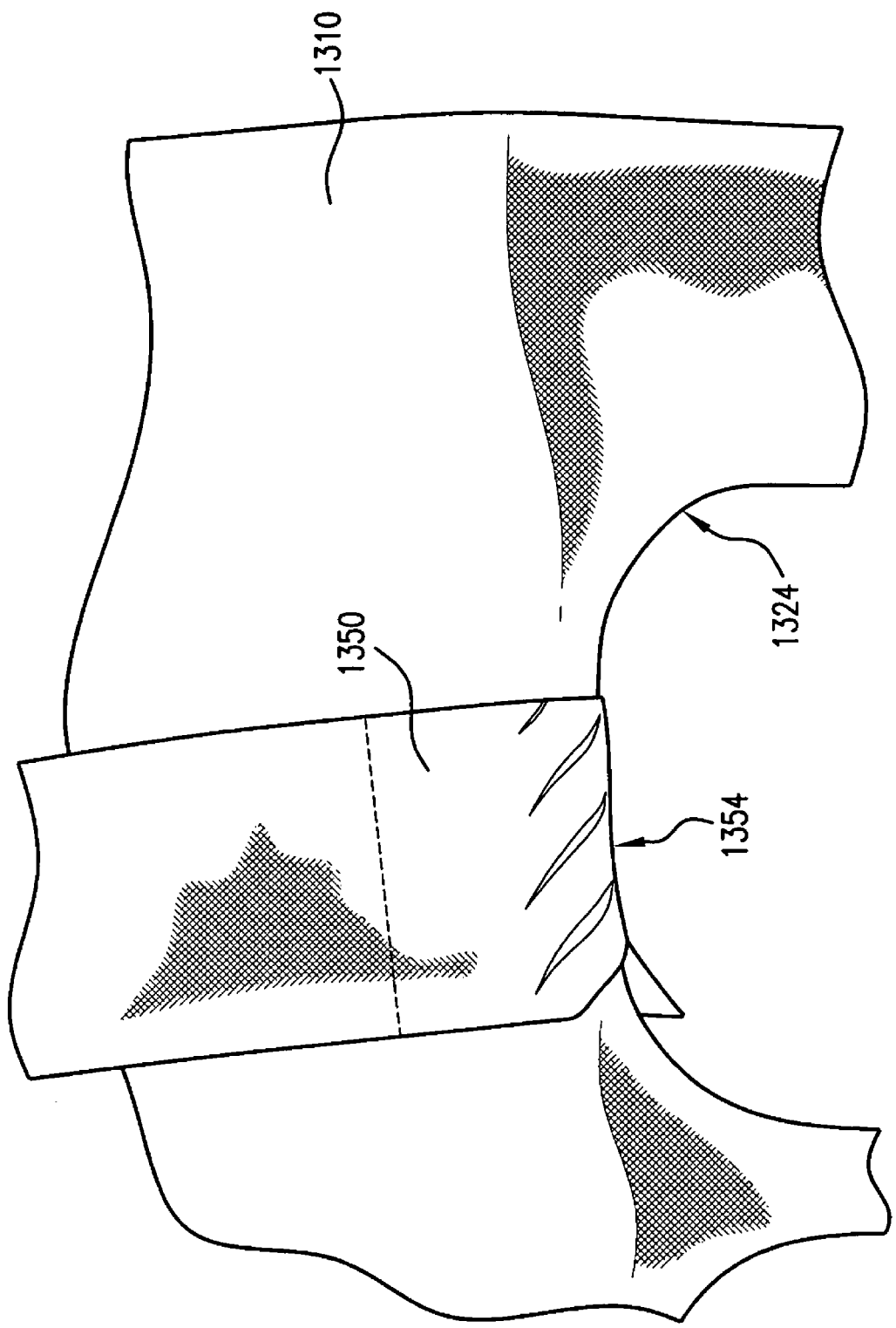
FIG. 31 is a view of a tear tab of the valve assembly of FIG. 29.
Figure 32:
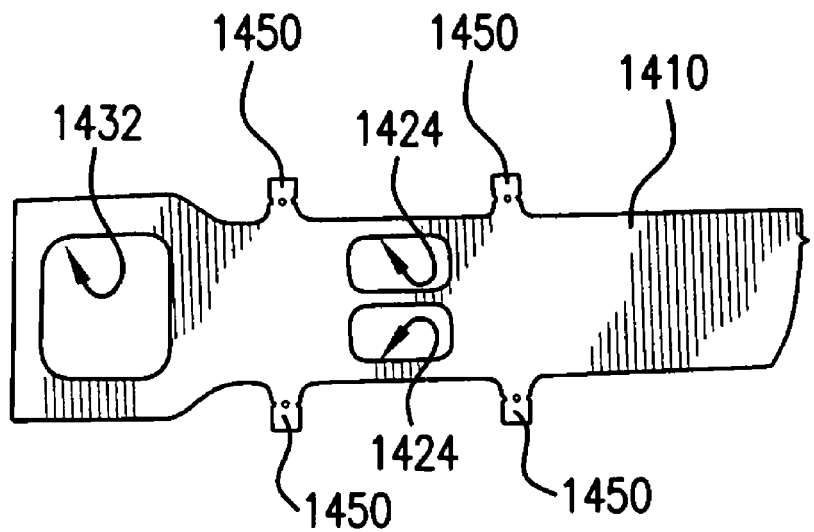
FIG. 32 is a top view of a valve assembly with a valve sheet and tear tabs according to another embodiment of the invention.

FIGS. 29 and 30 illustrate an alternative embodiment utilizing tear zone tabs 1350. In this embodiment, the valve sheet 1310 does not include an envelope. Rather, the tear zone tabs 1350 wrap around and restrain the folded up excess material 1322 of the valve sheet 1310. The valve A sheet 1310 and tear zone tabs 1350 are stitched to the airbag 1301 by a seam 1340. When the airbag 1301 inflates past a predetermined point, the valve sheet 1310 is pulled and the force of the pull breaks the tear zone tabs 1350. The tear zone tabs 1350 of this embodiment are similar to that shown in FIGS. 28 and 31. Alternatively, the valve sheet 1310 may use a valve guide or any other suitable retainer guide to maintain the initial position of the valve sheet 1310.

Figure 35:
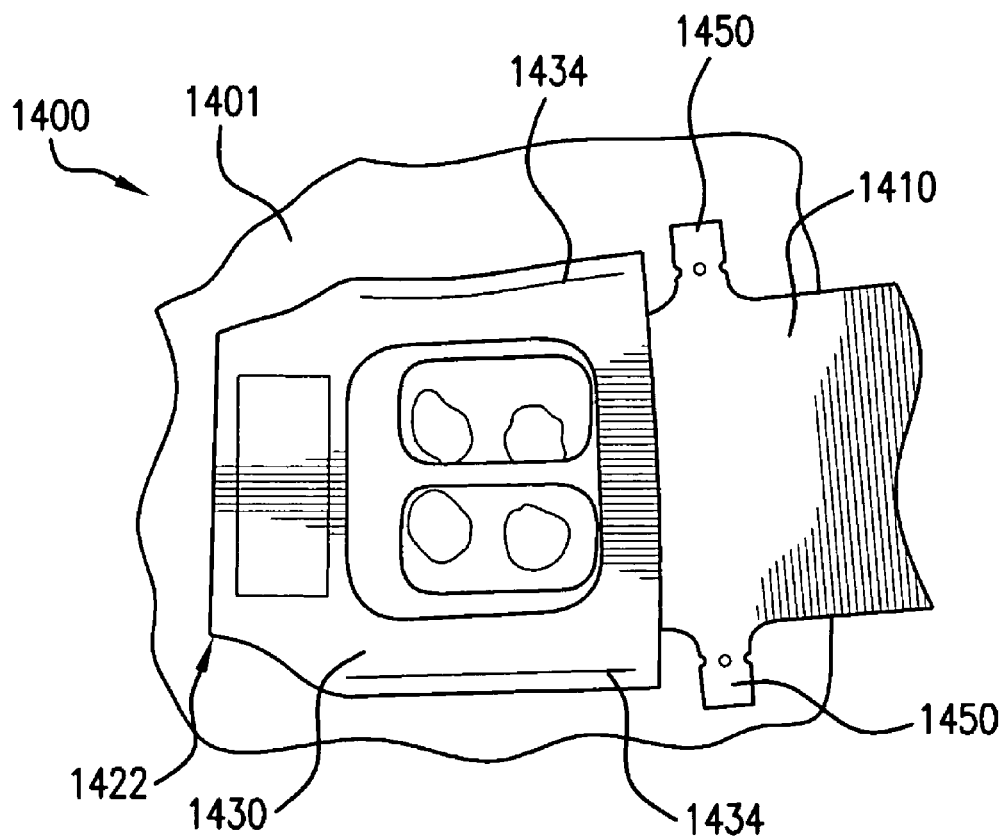
FIG. 35 is a view of the valve sheet of FIG. 32 attached to an airbag prior to inflation.
Figure 36:
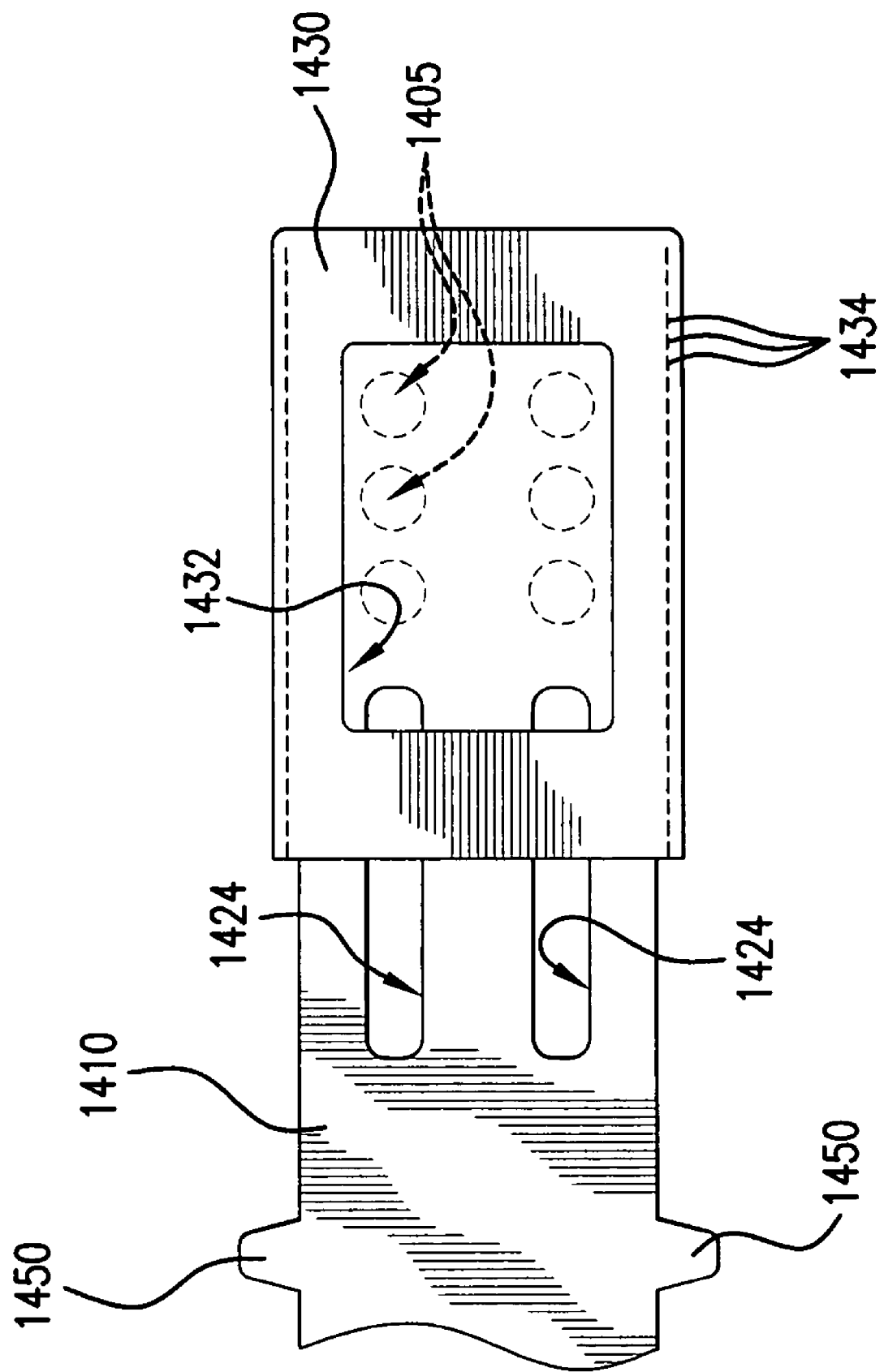
FIG. 36 is a view of the valve sheet of FIG. 32 after inflation of the airbag, in which the tear tabs are broken.

FIGS. 32 to 36 illustrate another embodiment of a passive venting assembly with a vent valve in an airbag 1400. The vent valve includes a valve sheet 1410 and a first vent opening 1405 in a fabric panel 1401. The first vent opening 1405 enables inflation fluid to escape out of the airbag during deployment. In this embodiment, the valve sheet 1410 is attached to the fabric panel 1401 of the airbag 1400. FIGS. 35 and 36 illustrate a first (airbag) vent opening 1405 that comprises a plurality of small vent openings. It will be recognized that the first (airbag) vent opening 1405 may comprise any suitable number, shape and size of openings.

The valve sheet 1410 includes a second vent opening 1424 that is movable relative to the first vent opening 1405. The second vent opening 1424 is shown for exemplary purposes with two openings. It will be recognized that the second vent opening 1424 may comprise any suitable number, shape and size of openings.

The valve sheet 1410 is secured (fixed) at opposite ends to the fabric panel 1401. The valve sheet remains fixed to the airbag 1400 during and after inflation of the airbag 1400. A distal end (not shown) of the valve sheet 1410 is fixed to the fabric panel 1401 away from the first vent opening 1405 by sewn stitches or any other suitable manner. The opposite end of the valve sheet 1410 is fixed closer to the first vent opening 1205 by sewn stitches or any other suitable manner.

The valve sheet 1410 is folded over itself to form a "pocket" (valve guide) 1430 to guide the valve sheet 1410. The sides of one end of the valve sheet 1410 are attached to the fabric panel 1401 by sewn seams 1434 or by another mechanism and the valve sheet 1410 is folded under so that a portion of the valve sheet 1410 is between the pocket 1430 and the fabric panel 1401. The pocket portion 1430 of the valve sheet 1410 may be wider than the remainder of the valve sheet 1410 to accommodate the folded under portion of the valve sheet 1410.

The pocket 1430 includes a pocket (third) vent opening 1432 aligned with the first vent opening 1405. During inflation of the airbag 1400, the valve sheet 1410 is stretched or pulled, thus moving the valve sheet 1410 and second vent opening 1424 relative to and away from the first vent opening 1405, thus blocking the first vent opening 1405 and closing the vent valve. Closing of the valve by blocking the first vent opening 1405 prevents inflation fluid from escaping out of the airbag 1400.

The valve sheet 1410 includes a folded over section of excess material 1422 that is secured by a tear tab 1450, or a plurality of tear tabs 1450 such as shown in FIGS. 32 to 36. The excess material 1422 section is used to align the second vent opening 1424 with the first vent opening 1405. When the valve sheet 1410 is pulled during inflation of the airbag 1400, the force from the pulling of the valve sheet 1410 breaks the tear tabs 1450, releasing the excess material 1422 and moving the second vent opening 1424 away from the first vent opening 1405.

The tear tabs 1450 are integral portions of the valve sheet 1410 that are fixed to the fabric panel 1401 of the airbag 1400. The tear tabs 1450 include a tear area 1451 that is configured to break when a predetermined level of inflation is reached and the valve sheet 1410 is pulled a predetermined amount. The tear area 1451 includes notches and openings which create a weakened area, thus allowing the tear tabs 1450 to break at the predetermined time.

Figure 33:
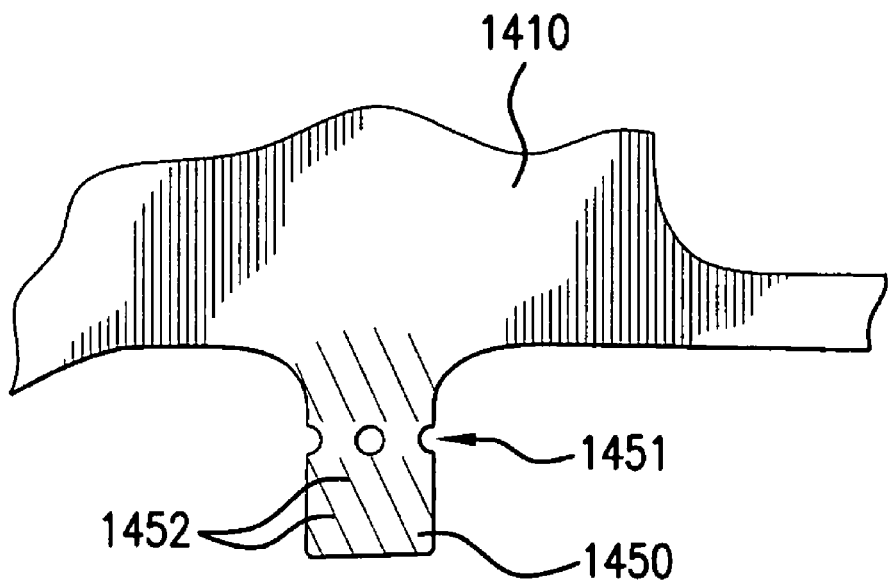
FIG. 33 is a view of the tear tab of the valve assembly of FIG. 32.
Figure 34:
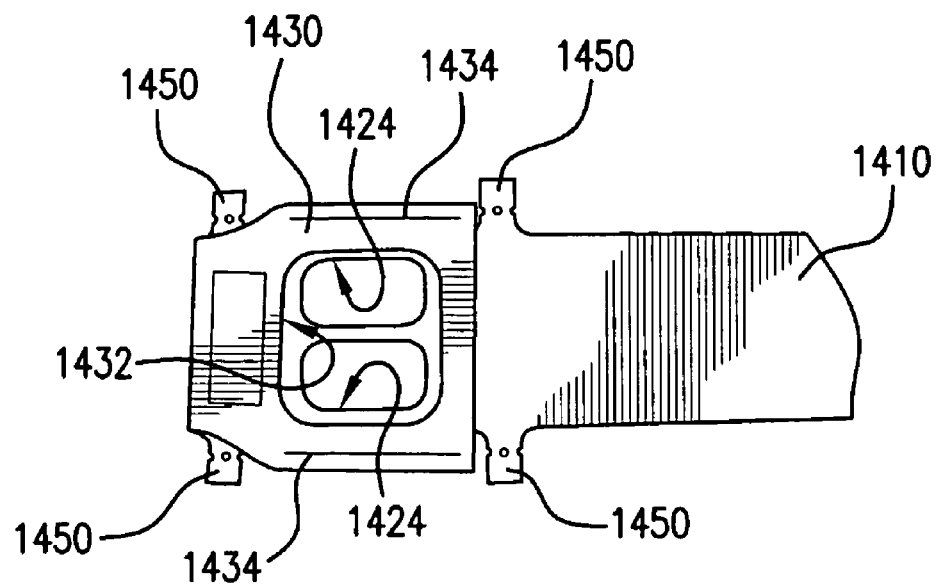
FIG. 34 is a top view of the valve sheet of FIG. 32, in which the valve sheet is arranged in an initial position prior to inflation of the airbag.

The fibers 1452 in the tear tabs 1450 (and also valve sheet 1410) are at a 45 degree angle to an edge of the second vent opening. The fibers 1452 of the tear tabs 1450 are arranged in an angle such that the fiber strands 1452 are discontinuous at the tear area 1451 to allow the tear tabs 1450 to break when required. FIG. 33 illustrates an example of the fibers 1452 in the tear area 1451. Alternatively, the fibers 1452 may be arranged in any suitable angle such that the fiber strands are discontinuous at the tear area 1451.

Figure 37:
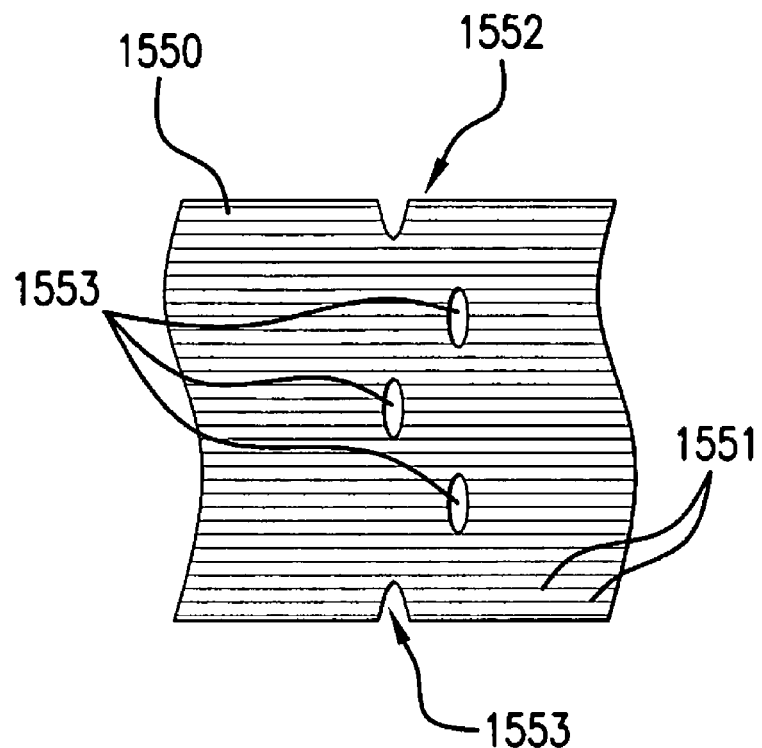
FIG. 37 is a diagram of tear slits according to another embodiment of the invention.

FIG. 37 illustrates an alternative embodiment for tear tabs 1550. This embodiment may be used with the tear tabs 1350, 1450 described above. In FIG. 37, the fibers 1551 of the tear tab 1550 are discontinuous in the tear area 1552. By being "discontinuous," the fibers 1551 do not extend in a single strand beyond the tear area 1552 (notches, etc.). In this embodiment, the notches 1553 are staggered to break up the fibers 1551. This discontinuity enables the tear tabs 1450 to break. Without the discontinuity it is more difficult to control the breaking of the tear tabs 1450 at the predetermined time.

Figure 38:
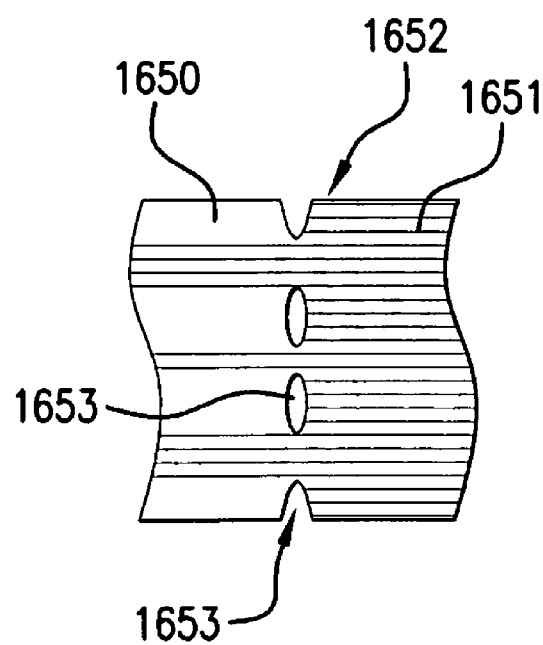
FIG. 38 is a diagram of tear slits.

FIG. 38 illustrates a tear tab 1650 without a discontinuity in the fibers 1651 at the tear area 1652. The long fibers 1651 are able to extend past the notches 1653 in the tear area 1652.

An advantage of the tear tabs 1350, 1450, 1550 is to reduce the variability of the tension required to break the tear tabs 1350, 1450, 1550 during inflation.

Figure 39:
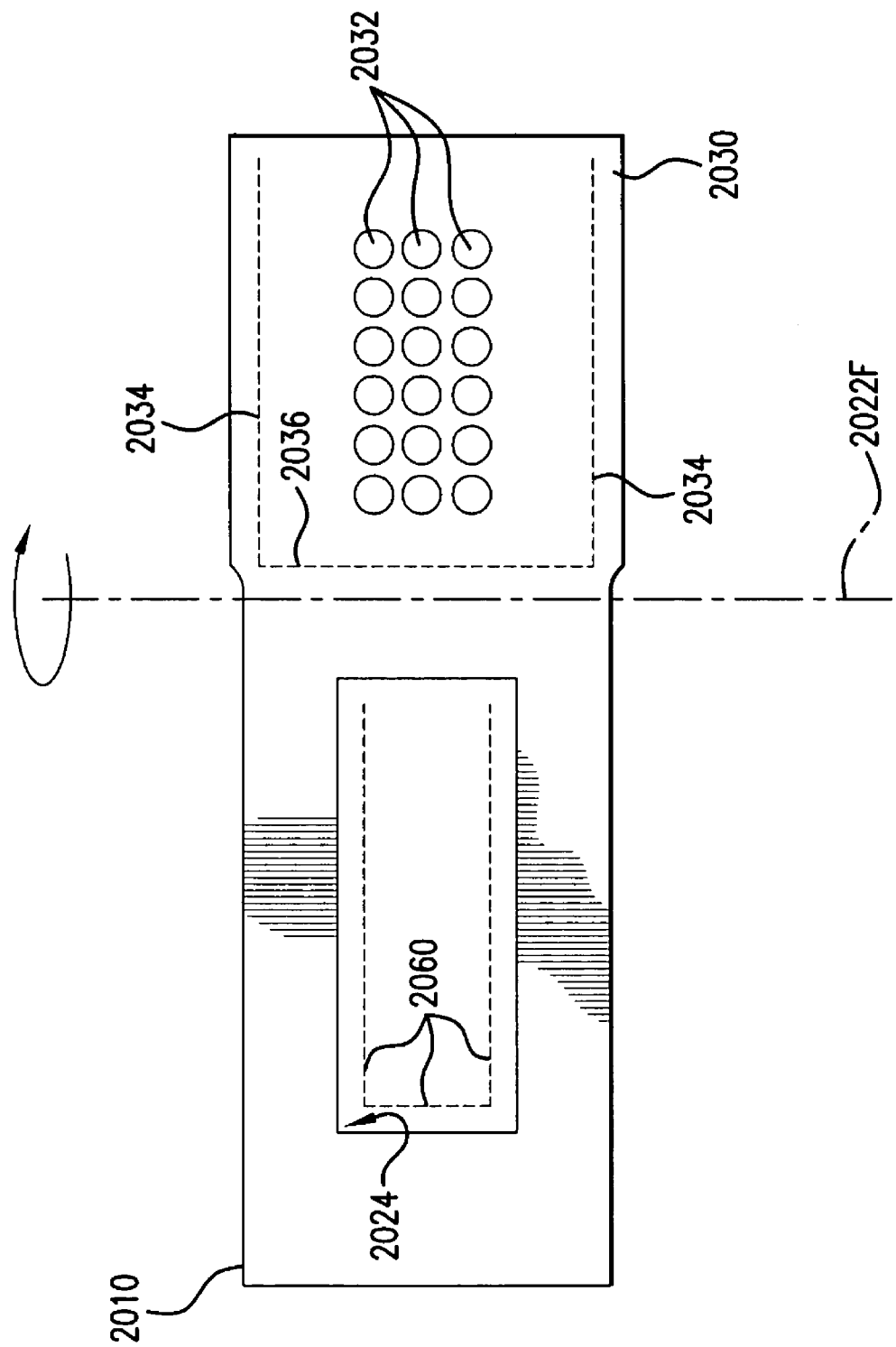
FIG. 39 is a top view of a valve sheet and pocket of a vent valve according to another embodiment of the invention, in which the valve sheet and pocket are fully extended prior to attachment to a fabric panel.
Figure 40:
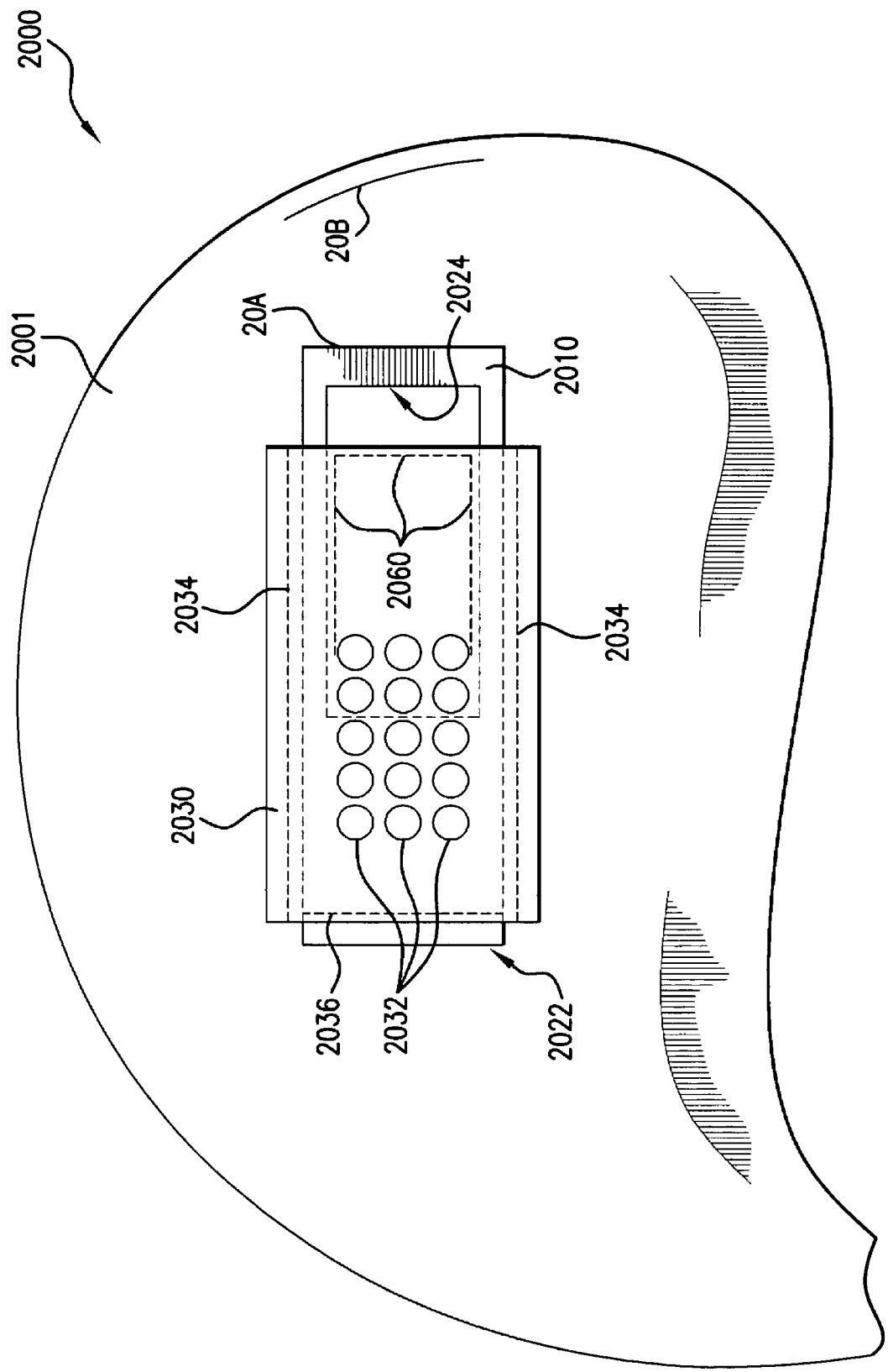
FIG. 40 is a top view of the valve sheet and pocket of the vent valve of FIG. 39 in which the valve sheet and pocket are attached to a fabric panel and the vent valve is partially open.

FIGS. 39-to 40 illustrate another embodiment of a vent valve in an airbag 2000. The vent valve includes a valve sheet 2010 and a first vent opening (not shown) in a fabric panel 2001. FIG. 39 illustrates the valve sheet 2010 when fully extended and before attaching to the airbag 2000. FIG. 40 illustrates the vent valve with the valve partially opened. The first vent opening enables inflation fluid to escape out of the airbag during deployment. In this embodiment, the valve sheet 2010 is attached to the fabric panel 2001 of the airbag 20400. The first (airbag) vent opening, although not shown, may be similar to the airbag (first) vent openings disclosed in previous embodiments. For example, the first airbag vent opening may comprise a plurality of small vent openings or a single opening. It will be recognized that the first (airbag) vent opening may comprise any suitable number, shape and size of openings.

The valve sheet 2010 includes a second vent opening 2024 that is movable relative to the first vent opening. The second vent opening 2024 is shown for exemplary purposes with a single, rectangular opening. It will be recognized that the second vent opening 2024 may comprise any suitable number, shape and size of openings.

The valve sheet 2010 is secured (fixed) at opposite ends to the fabric panel 2001 such that ends of the valve sheet 2010 are not capable of moving relative to the fabric panel 2001 and the valve sheet 2010 remains fixed to the airbag 2000 during and after inflation of the airbag 2000. A distal end 20A of the valve sheet 2010 is fixed to the fabric panel 2001 away from the first vent opening by sewn stitches or any other suitable manner at location 20B. The location 20B is exemplary only and may be in any other suitable location on the fabric panel 2001. In the example shown in FIG. 40, the end 20A of the valve sheet 2010 is attached by a suitable mechanism to location 20B. Thus, when the airbag 2000 inflates and the fabric panel 2001 moves, the end 20A of the valve sheet 2010 moves with the fabric panel 2001, thus, closing the valve. The opposite end of the valve sheet 2010 is integral with a "pocket" (valve guide) 2030 and can be tacked to the fabric panel 2001 with temporary or tack stitching 2036. The tack stitching 2036 will break upon the airbag inflating and pulling the valve sheet 2010 such that the valve sheet 2010 is capable of moving. 101281 The valve sheet 2010 is folded over itself to form the "pocket" (valve guide) 2030 to guide the valve sheet 2010. The valve sheet 2010 is folded under at fold line 2022 F so that a portion of the valve sheet 2010 is between the pocket 2030 and the fabric panel 2001. The pocket portion 2030 of the valve sheet 2010 may be wider than the remainder of the valve sheet 2010 to accommodate the folded under portion of the valve sheet 2010. The pocket portion 2030 is attached to the fabric panel 2034 along sewn stitch line 2034, which are on opposite sides of the pocket portion 2030. In other words, when the opposite stitch lines 2034 and the tack stitching 2036 form a substantially "C" shape.

The pocket 2030 includes a pocket (third) vent opening 2032 aligned with the first vent opening. During inflation of the airbag 2000, the valve sheet 2010 is stretched or pulled, thus moving the valve sheet 2010 and second vent opening 2024 relative to and away from the first vent opening, thus blocking the first vent opening and closing the vent valve. Closing of the valve by blocking the first vent opening prevents inflation fluid from escaping out of the airbag 2000. As can be seen in FIG. 39, the pocket (third) vent opening 2032 is a plurality of openings. However, the vent opening 2032 can comprise a single or a plurality of openings in any suitable shape or size.

The valve sheet 2010 includes a folded over section of excess material 2022, folded along fold line 2022F, that is secured by the tack stitching 2036. The excess material 2022 section is used to align the second vent opening 2024 with the first vent opening. When the valve sheet 2010 is pulled during inflation of the airbag 2000, the force from the pulling of the valve sheet 2010 breaks the tack stitching 2036, releasing the excess material 2022 and moving the second vent opening 20424 away from the first vent opening.

As can be seen in FIGS. 39 and 40, the vent valve comprises valve alignment stitching 2060 that is configured to align and maintain the proper alignment of the valve sheet 2010 within the pocket 2030. When the valve sheet 2010 is within the pocket 2030, the valve sheet 2010 could be moved around during folding, packaging or storing of the airbag 2000. However, with the alignment stitching 2060, the valve sheet 2010 is prevented from moving around within the pocket 2030. The valve alignment stitching 2060 is shown in FIG. 39 as an illustration of the location of the stitching 2060. The alignment stitching 2060 connects the pocket 2030 to the fabric panel 2001 such that the alignment stitching 2060 forms a substantial "C" shape within the second opening 2024. It will be recognized that the alignment stitching 2060 may have any other suitable configuration or shape to prevent the valve sheet 2010 from moving around or "flopping" within the pocket 2030.

Figure 41:
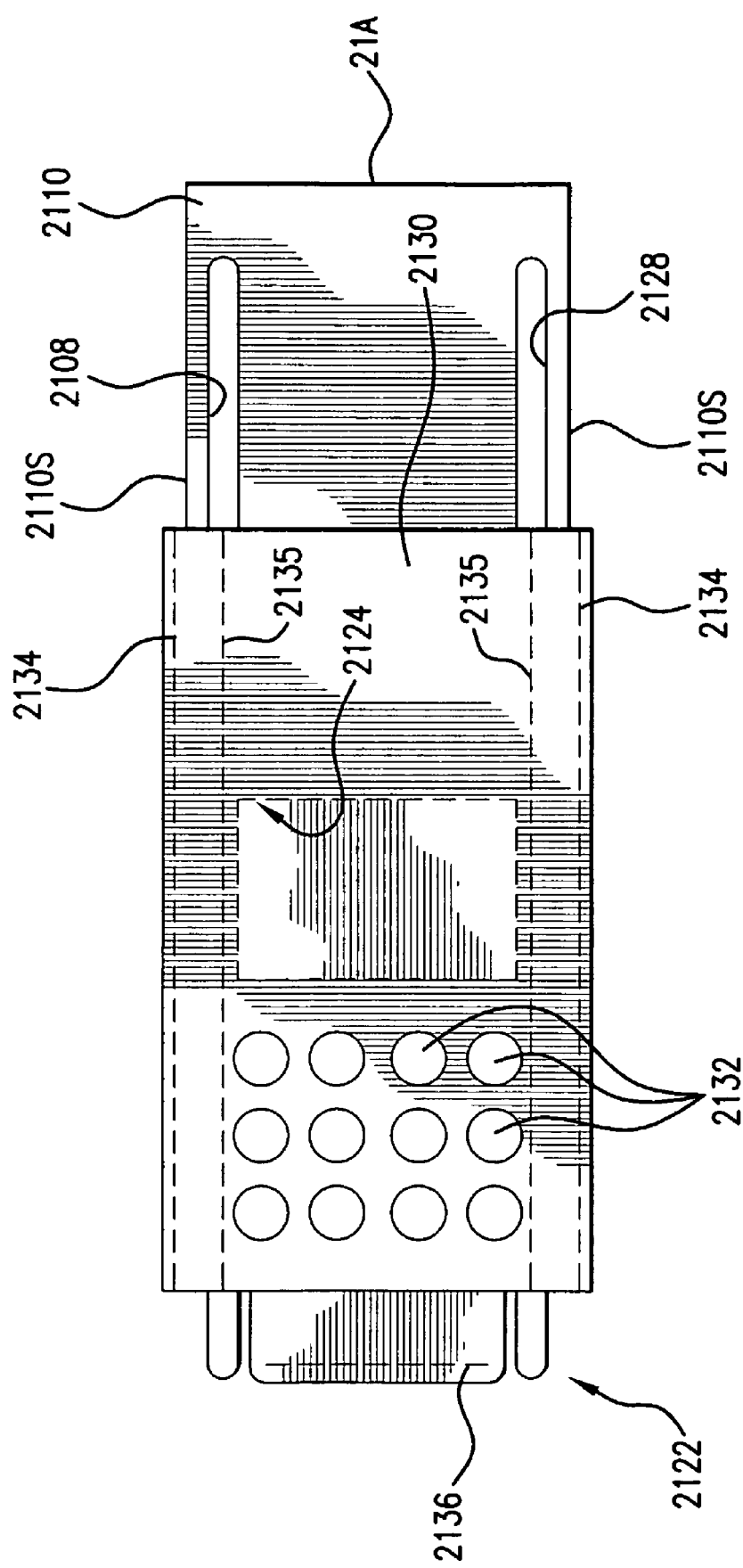
FIG. 41 is a top view of a valve sheet and pocket according to another embodiment of the invention in which a vent valve is fully closed.

FIG. 41 illustrates another embodiment of a vent valve in an airbag with the valve closed. The vent valve includes a valve sheet 2110 and a separate "pocket" (guide) 2130. It will be recognized that the valve sheet 2110 and pocket 2130 may be integrally formed or formed of separate pieces, such as shown in FIG. 41. In an embodiment, the valve sheet 2110 and pocket 2130 may comprise the same material, such as airbag fabric panel, or other stretchy fabric.

The valve sheet 2110 and pocket 210 may be similar to embodiments previously disclosed. The valve sheet 2110 comprises a valve (second) opening 2124 that is configured to align with a first (airbag) opening (not shown) in a fabric panel of an airbag. The pocket 2130 includes third (pocket) openings 2132 that are configured to align with the first opening. The first, second or third openings 2124, 2132 may be a single or a plurality of openings and may have any suitable shape or size. An end 21A of the valve sheet 2110 is configured to attach to a portion of a fabric panel so that when the airbag expands, the fabric panel pulls the end 21A of the valve sheet 2110 to close the vent valve.

The pocket 2130 includes outer pocket seams 2134 configured to attach the pocket 2130 to a fabric panel. The pocket 2130 also includes guide pocket seams 2135 configured to form a guide channel for the valve sheet 2110 to maintain alignment of the valve sheet 2110 within the pocket 2130. The valve sheet 2110 includes guide channels 2128 that correspond with the guide pocket seams 2135. Thus, the outer sides 2110S of the valve sheet 2110 are configured to be located between the corresponding outer pocket seam 2134 and the guide pocket seam 2135. The valve sheet 2110 is capable of moving within the pocket 2130 when the airbag inflates because of the guide channel slits 2128 in the valve sheet 2110. The guide channel slits 2128 are configured such that the guide pocket seams 2135 attach the pocket 2130 to the fabric panel, after the valve sheet 2110 is put into its proper location underneath the pocket 2130 such that the guide pocket seams 2135 extend through the guide channel slits 2128.

The valve sheet 2110 also includes tack stitching 2136 to initially keep a folded section 2122 of the valve sheet in place so that the valve sheet 2110 covers the first airbag opening. When the airbag inflates and pulls the valve sheet 2110, the tack stitching 2136 will be pulled out, thus allowing the valve sheet 2110 to move and close the valve.

Figure 42:
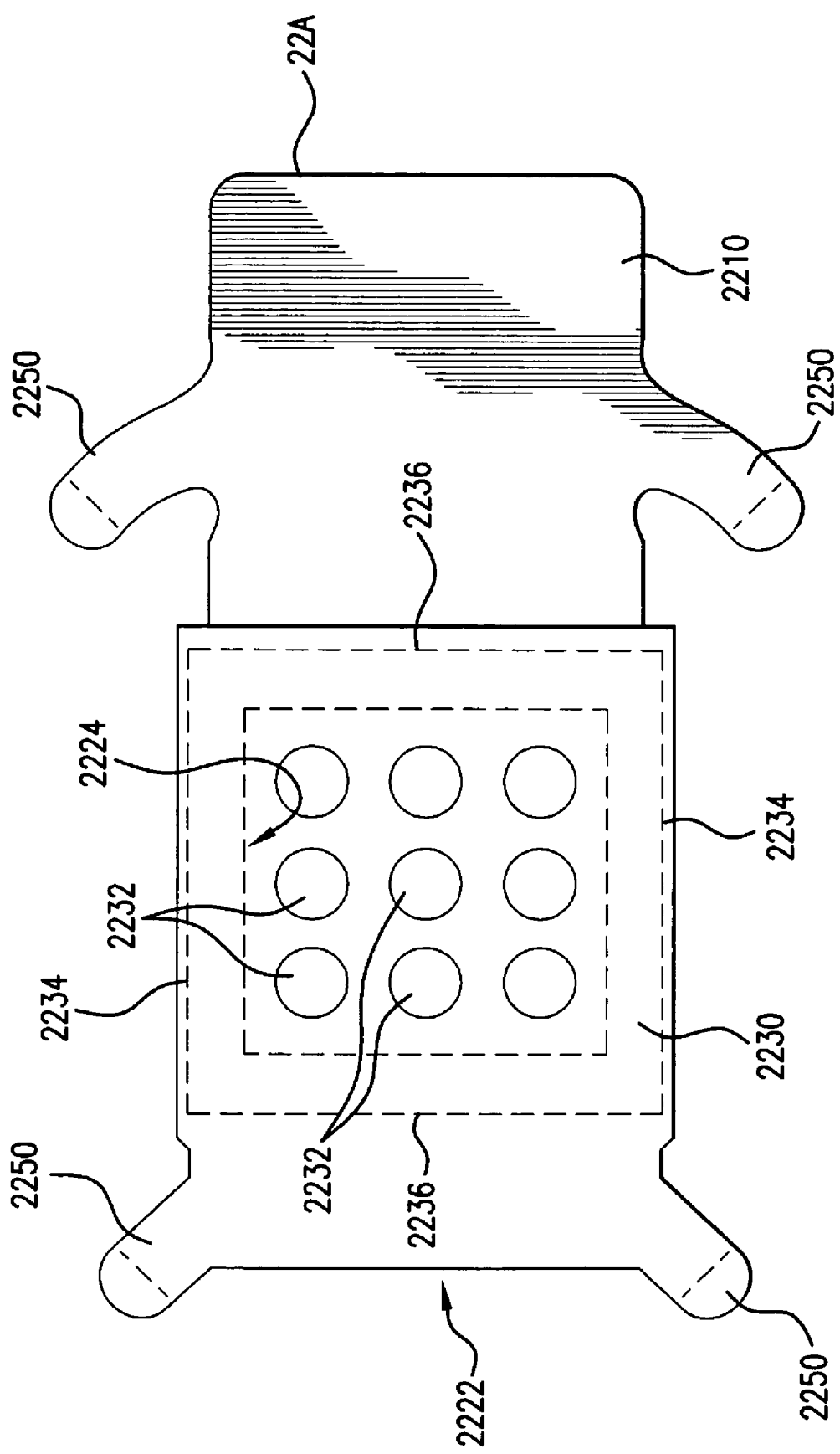
FIG. 42 is a top view of a valve sheet and integral pocket according to another embodiment of the invention in which a vent valve is fully open.

Another embodiment of a vent valve in an airbag is shown in FIG. 42. The vent valve includes valve sheet 2210 integrally formed with a "pocket" (guide) 2230. One end 22A of the valve sheet 2210 is attached to a portion of a fabric panel (not shown) in an airbag such that when the airbag inflates, the fabric panel pulls the end 22A of the valve sheet to close the vent valve. The opposite end of the valve sheet 2210 is integrally formed with the pocket 2230 the valve sheet 2210 is folded over itself at a folded portion 2222 to form the pocket 2230.

The pocket 2230 includes pocket seams 2234 to attach the pocket 2230 to the fabric panel. The pocket 2230 also includes tack stitching 2236 which extends through the valve sheet 2210 and fabric panel to help keep the valve sheet 2210 properly aligned with the vent opening in the fabric panel and the pocket 2230. The valve sheet 2210 further includes tear tabs 2250 which are configured to attach sides of the valve sheet 2210 to the fabric panel and help maintain the proper alignment of the valve sheet 2210. When the airbag inflates and the end 22A of the valve sheet is pulled, after a sufficient force is produced, the tack stitching 2236 and tear tabs 2250 can break, thus allowing the valve sheet 2210 to move and cover the vent openings in the fabric panel to close the vent valve.

It will be recognized that the tear tabs and valve assemblies can be used for any type of airbag, such as a driver, passenger, side, or knee airbag. The tear tabs and valve assemblies described above may be used on a dual lobe type airbag configuration, or any other type of cushion configuration. Further, any suitable type, number and size of airbag openings, valves, valve sheet openings and envelope openings may be used. For example, the vents and/or openings may be x-vents, a plurality of holes, or any other suitable type of vent or opening. Further, the airbag may be used in conjunction with a part of or an entire passive tether system, or a plurality of passive tether systems, such as described in any of the above embodiments.

In the embodiments described above, the opposite ends of the valve sheet remain fixed to the fabric panel of the airbag prior to, during and after inflation of the airbag. Alternatively, one or both ends of the valve sheet may be released during inflation of the airbag.

It will be recognized that the tear zone and tear tabs are adjustable at the design stage such that tear forces can be adjusted for the optimal condition. The tear zone/tabs can be adjusted by modifying the perforations in the fabric (slits, openings, etc.).

It will be recognized that any number of tear tabs or tack stitching may be used. Two and four tear tabs are shown in the above described figures. However, one, three, four, or more tear zone tabs may be utilized as appropriate. The tear tabs and valve sheets may be made of webbing, airbag fabric panel material, or any other suitable material.

It will be recognized that the passive venting assembly and airbag shown and described above are exemplary only. Various types of airbags and passive venting assemblies may be used in conjunction with a tear tab.

Embodiments of the invention can provide tear zone tabs without additional material costs for the airbag because the tear zone tabs utilize existing fabric.

It will be recognized that the above embodiments describe an airbag vent (first vent opening) initially open, with the passive venting assemblies then closing/covering the airbag vent during inflation of the airbag, but that the passive venting assemblies may be used to open an initially closed airbag vent.

It will be recognized that any suitable amount of cushion vents (first vent openings) and/or valve sheet vents (second vent openings) may be used.

It will be recognized that the vent guide can have different embodiments. Further, the vent guide can comprise different shapes and components. For example, the vent guide does not need to be a one-piece configuration, but could comprise multiple pieces. Furthermore, the shapes of the vent openings and valve sheet/valve sheet extension can be altered. The vent guide can be comprised of fabric, or any other suitable material. Further, any combination of the above described embodiments may be used.

It will also be recognized that airbag systems using the above disclosed passive venting may or may not include seat sensors (i.e., seat weight sensors, etc.).

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection apparatus comprising:
   an inflatable airbag including a panel, wherein the panel includes a first vent opening through which inflation fluid may escape out of the airbag;
   a moveable valve sheet overlying the first vent opening and including a second vent opening movable relative to the first vent opening, the valve sheet being fixed to a surface of the panel at opposite ends;
   a valve guide to guide movement of the valve sheet relative to the panel, wherein the valve sheet is configured to slide between the valve guide and the panel, the valve guide including a third vent opening alignable with the first vent opening; and
   a tear tab configured to maintain the initial configuration of the valve sheet prior to inflation,
   wherein one end of the valve sheet moves with a leading end portion of the panel during deployment of the airbag to move the second vent opening relative to the first vent opening,
   wherein the first and a second end of the valve sheet are fixed to the panel during and after inflation of the airbag,
   wherein the tear tab is configured to break during inflation of the airbag to release a portion of the valve sheet to allow the valve sheet to move relative to the vent opening,
   wherein the second vent opening comprises a plurality of openings in a region of the valve sheet, and
   wherein in an initial, uninflated state, the second vent opening is aligned with the first and third vent openings, and after deployment of the airbag, the second vent opening is misaligned with the first and third vent openings to close the first vent opening.

2. The occupant protection apparatus of claim 1, further comprising tearable stitching configured to maintain an initial configuration of the valve sheet prior to inflation, the tearable stitching being configured to break during inflation of the airbag to thereby allow the valve sheet to move relative to the first vent opening.

3. The occupant protection apparatus of claim 1, wherein one end of the valve sheet is fixed to the panel near the first vent opening and the second end is fixed away from the first vent opening.

4. The occupant protection apparatus of claim 3, wherein both ends of the valve sheet are fixed to a surface of the panel configured to be in contact with inflation fluid in an inflatable chamber.

5. The occupant protection apparatus of claim 1, wherein the valve sheet is an integral sheet extending from the first end to the second end.

6. The occupant protection apparatus of claim 1, wherein the second vent opening is movable relative to the first vent opening such that the first and second vent openings are aligned in an open state prior to inflation of the airbag and the first and second vent openings are misaligned in a closed state during a later stage of inflation of the airbag.

7. The occupant protection apparatus of claim 1, wherein the tear tab comprises slits such that fibers of the tear tab adjacent the slit are discontinuous.

8. The occupant protection apparatus of claim 7, wherein the slits are at a 45 degree angle to an edge of the second vent opening.

9. The occupant protection apparatus of claim 1, wherein the valve guide is a portion of the valve sheet, wherein the portion of the valve sheet comprising the valve guide and the third vent opening is folded over and overlaps a portion of the valve sheet comprising the second vent opening when the airbag is in the uninflated state.

10. An airbag, comprising:
a wall defining an interior in which a gas is received to inflate the airbag, and at least one airbag opening through the wall; and
a vent valve carried by the wall and having a valve sheet including at least one valve opening, the vent valve being moveable between a first position where the at least one valve opening is in registration with the at least one airbag opening and a second position where the at least one valve opening is at least partially misaligned with the at least one airbag opening to at least partially close the at least one airbag opening, and
wherein the vent valve is in its first position until deployment of the airbag beyond a threshold which moves the vent valve to its second position;
wherein the valve sheet is folded within the interior of the airbag when the vent valve is in its first position, and movement of the airbag when deployed beyond the threshold at least partially unfolds the valve sheet to move the vent valve to its second position;
wherein the valve sheet folded onto itself provides a first leg and a second leg with a bight between them, the first leg and second leg each being connected to the wall, and at least one of the first and second legs including the at least one valve opening that is aligned with the at least one airbag opening when the vent valve is in its first position,
wherein the valve sheet is extended and increasingly unfolds when the airbag is deployed beyond the threshold to lengthen the second leg and shorten the first leg so that the at least one valve opening is moved relative to and at least partially out of registry with the at least one airbag opening, which reduces extrusion of the valve sheet therethrough under force of pressurized gas, and wherein the vent valve further includes an envelope positioned over a portion of the valve sheet to overlap the valve sheet, the envelope including a third vent opening alignable with the first vent opening, wherein the envelope is an integral component of the valve sheet.

11. The airbag of claim 10, wherein the vent valve is releasably connected to the airbag in its first position to maintain the vent valve in its first position until the airbag has deployed beyond the threshold.

12. The airbag of claim 11, wherein the vent valve is stitched to the airbag by at least one stitch, and the at least one stitch is constructed and arranged to be broken or pulled out upon deployment of the airbag beyond the threshold.

13. The airbag of claim 10, wherein the valve sheet is accordion folded in its first position providing at least one pleat.

14. The airbag of claim 13, wherein the pleat is taken up when the vent valve moves to its second position to move the at least one valve opening at least partially out of registry with the at least one airbag opening through the wall.

15. The airbag of claim 10, wherein the valve sheet is connected to the wall on either side of at least one fold so that movement of the wall as the airbag is deployed beyond the threshold at least partially extends the valve sheet to move the vent valve toward its second position.

16. The airbag of claim 10, wherein the valve sheet entirely covers each of the at least one airbag opening through the wall when the vent valve is in its second position.

17. The airbag of claim 10, wherein the valve sheet is formed from the same material as the airbag wall.

18. An airbag, comprising:
a wall defining an interior in which a gas is received to inflate the airbag, and at least one airbag opening through the wall; and
a vent valve having a valve sheet folded onto itself and including first and second legs with a bight between them, the first and second legs each being connected to the wall and having a valve opening, the valve opening of the first leg being aligned with the at least one airbag opening, the vent valve being moveable between a first position where the valve opening of the second leg is aligned with the at least one airbag opening and a second position where the valve sheet is extended to lengthen the second leg and shorten the first leg to at least partially misalign the valve opening of the second leg with the at least one airbag opening and at least partially close the at least one airbag opening, and wherein the vent valve is in its first position until deployment of the airbag beyond a threshold which moves the vent valve to its second position;
wherein the vent valve when in its first position is folded within the interior of the airbag, and movement of the airbag when deployed beyond the threshold at least partially unfolds the valve sheet to move the vent valve to its second position.

19. An airbag, comprising:
a wall defining an interior in which a gas is received to inflate the airbag, and at least one airbag opening through the wall; and
a vent valve having a valve sheet folded onto itself and including first and second legs with a bight between them, the first and second legs each being connected to the wall and having a valve opening, the valve opening of the first leg being aligned with the at least one airbag opening, the vent valve being moveable between a first position where the valve opening of the second leg is aligned with the at least one airbag opening and a second position where the valve sheet is extended to lengthen the second leg and shorten the first leg to at least partially misalign the valve opening of the second leg with the at least one airbag opening and at least partially close the at least one airbag opening, and wherein the vent valve is in its first position until deployment of the airbag beyond a threshold which moves the vent valve to its second position;

wherein the vent valve when in its first position is folded within the interior of the airbag, and movement of the airbag when deployed beyond the threshold at least partially unfolds the valve sheet to move the vent valve to its second position;

wherein the valve opening of the first leg remains aligned with the at least one airbag opening when the vent valve is in its second position.

* * * * *